United States Patent [19]
Sieberth

[11] Patent Number: 5,464,549
[45] Date of Patent: Nov. 7, 1995

[54] OIL SOLUBLE DISPERSANTS SUITABLE FOR USE IN FUELS AND LUBRICANTS

[75] Inventor: John F. Sieberth, Baton Rouge, La.

[73] Assignee: Ethyl Corporation, Richmond, Va.

[21] Appl. No.: 806,145

[22] Filed: Dec. 12, 1991

[51] Int. Cl.$^6$ .................. C10M 133/58; C10M 133/56; C10M 159/16
[52] U.S. Cl. .................. 252/51.5 A; 526/262; 526/272; 526/285; 548/520; 548/546; 548/547; 549/233; 549/234; 549/252; 560/190; 560/204; 564/134; 564/138; 564/152; 564/153
[58] Field of Search .................. 526/262, 272, 526/285; 548/520, 546, 547; 252/51.5 R, 51.5 A, 56 D; 560/190, 204; 525/327.6, 329.5, 329.6, 379, 380, 382, 384, 327.7; 564/152, 153; 549/233, 234, 252

[56] References Cited

U.S. PATENT DOCUMENTS

| | | | |
|---|---|---|---|
| 3,131,150 | 4/1964 | Stuart | 252/34.7 |
| 4,234,435 | 11/1980 | Meinhardt et al. | 252/51.5 A |
| 5,053,462 | 10/1991 | Bender et al. | 525/285 |
| 5,085,788 | 2/1992 | Emert et al. | 252/51.5 A |
| 5,112,507 | 5/1992 | Harrison | 252/51.5 A |
| 5,130,359 | 7/1992 | Ohsumi et al. | 252/51.5 A |
| 5,137,980 | 8/1992 | DeGonia et al. | 525/327.6 |
| 5,259,968 | 11/1993 | Emert et al. | 252/51.5 A |

Primary Examiner—Margaret Medley
Attorney, Agent, or Firm—Dennis H. Rainear; William H. Thrower

[57] ABSTRACT

The dispersants are formed by reacting (a) at least one dispersant having at least one primary or secondary amino group and/or at least one hydroxyl group, with (b) at least one polyolefinic compound substituted at each terminal position by a succinic group. Suitable substances for use as reactant (b) include compounds derived from at least one telechelic compound having up to 5000 carbon atoms and at least two terminal methylene groups by reaction with maleic anhydride or the like. The products are deemed to be effective dispersant/detergents for use in fuels and lubricants. In fuels the products are deemed to exhibit the property of inhibiting and/or reducing deposit formation such as intake valve deposits. In crankcase lubricants, the products are deemed to provide desirable viscosity index improving properties.

1 Claim, No Drawings

OIL SOLUBLE DISPERSANTS SUITABLE FOR USE IN FUELS AND LUBRICANTS

TECHNICAL FIELD

This invention relates to oil soluble compositions useful as dispersant additives for oleaginous compositions, particularly lubricating oil compositions, including concentrates containing said additives, and methods for their manufacture and use.

BACKGROUND

Multigrade lubricating oils typically are identified by two numbers such as 10W30, 5W30 etc. The first number in the multigrade designation is associated with a maximum low temperature (e.g., −20° C.) viscosity requirement for that multigrade oil as measured typically by a cold cranking simulator (CCS) under high shear, while the second number in the multigrade designation is associated with a minimum high temperature (e.g. 100° C.) viscosity requirement. Thus, each particular multigrade oil must simultaneously meet both strict low and high temperature viscosity requirements in order to qualify for a given multigrade oil designation. Such requirements are set e.g., by ASTM specifications. By "low temperature" as used herein is meant temperatures of typically from about −30° to about −5° C. By "high temperature" as used herein is meant temperatures of at least about 100° C.

The minimum high temperature viscosity requirement, e.g. at 100° C., is intended to prevent the oil from thinning out too much during engine operation which can lead to excessive wear and increased oil consumption. The maximum low temperature viscosity requirement is intended to facilitate engine starting in cold weather and to ensure pumpability, i.e., the cold oil should readily flow or slump into the well for the oil pump, otherwise the engine can be damaged due to insufficient lubrication.

In formulating an oil which meets both low and high temperature viscosity requirements, use may be made of a single oil of desired viscosity or a blend of two or more lubricating oils of difference viscosities, in conjunction with manipulating the identity and amount of additives that must be present to achieve the overall target properties of a particular multigrade oil including its viscosity requirements.

The natural viscosity characteristic of a lubricating oil is typically expressed by the neutral number of the oil (e.g. S150N) with a higher neutral number being associated with a higher natural viscosity at a given temperature. In some instances the formulator will find it desirable to blend oils of two different neutral numbers, and hence viscosities, to achieve an oil having a viscosity intermediate between the viscosity of the components of the oil blend. Thus, the neutral number designation provides the formulator with a simple way to achieve a desired base oil of predictable viscosity. Unfortunately, merely blending oils of different viscosity characteristics does not enable the formulator to meet the low and high temperature viscosity requirements of multigrade oils. The formulators primary tool for achieving this goal is an additive conventionally referred to as viscosity index improver (i.e., V.I. improver).

The V.I. improver is conventionally an oil-soluble long chain polymer. The large size of these polymers enables them to significantly increase kinematic viscosities of base oils even at low concentrations. However, because solutions of high polymers are non-Newtonian they tend to give lower viscosities that expected in a high shear environment due to the alignment of the polymer. Consequently, V.I. improvers impact (i.e., increase) the low temperature (high shear) viscosities (i.e. CCS viscosity) of the base oil to a lesser extent than they do the high temperature (low shear) viscosities.

The aforesaid viscosity requirements for a multigrade oil can therefore be viewed as being increasingly antagonistic at increasingly higher levels of V.I. improver. For example, if a large quantity of V.I. improver is used in order to obtain high viscosity at high temperatures, the oil may now exceed the low temperature requirement. In another example, the formulator may be able to readily meet the requirement for a 10W30 oil but not a 5W30 oil, with a particular ad-pack (additive package) and base oil. Under these circumstances the formulator may attempt to lower the viscosity of the base oil, such as by increasing the proportion of low viscosity oil in a blend, to compensate for the low temperature viscosity increase induced by the V.I. improver, in order to meet the desired low and high temperature viscosity requirements. However, increasing the proportion of low viscosity oils in a blend can in turn lead to a new set of limitations on the formulator, as lower viscosity base oils are considerably less desirable in diesel engine use than the heavier, more viscous oils.

Further complicating the formulators task is the effect that dispersant additives can have on the viscosity characteristics of multigrade oils. Dispersants are frequently present in quality oils such as multigrade oils, together with the V.I. improver. The primary function of a dispersant is to maintain oil insolubles, resulting from oxidation during use, in suspension in the oil thus preventing sludge flocculation and precipitation. Consequently, the amount of dispersant employed is dictated and controlled by the effectiveness of the material for achieving its dispersant function. A high quality 10W30 commercial oil might contain from two to four times as much dispersant as V.I. improver (as measured by the respective dispersant and V.I. improver active ingredients). In addition to dispersancy, conventional dispersants can also increase the low and high temperature viscosity characteristics of a base oil simply by virtue of their polymeric nature. In contrast to the V.I. improver, the dispersant molecule is much smaller. Consequently, the dispersant is much less shear sensitive, thereby contributing more to the low temperature CCS viscosity (relative to its contribution to the high temperature viscosity of the base oil) than a V.I. improver. Moreover, the smaller dispersant molecule contributes much less to the high temperature viscosity of the base oil than the V.I. improver. Thus, the magnitude of the low temperature viscosity increase induced by the dispersant can exceed the low temperature viscosity increase induced by the V.I. improver without the benefit of a proportionately greater increase in high temperature viscosity as obtained from a V.I. improver.

Consequently, as the dispersant induced low temperature viscosity increase causes the low temperature viscosity of the oil to approach the maximum low temperature viscosity limit, the more difficult it is to introduce a sufficient amount of V.I. improver effective to meet the high temperature viscosity requirement and still meet the low temperature viscosity requirement. The formulator is thereby once again forced to shift to the undesirable expedient of using higher proportions of low viscosity oil to permit addition of the requisite amount of V.I. improver with out exceeding the low temperature viscosity limit.

THE INVENTION

In accordance with this invention, dispersants are provided which are deemed to possess inherent characteristics such that they contribute considerably less to low temperature viscosity increase than dispersants of the prior art while achieving similar high temperature viscosity increases. Moreover, as the concentration of dispersant in the base oil is increased, this beneficial low temperature viscosity effect can become increasingly more pronounced relative to conventional dispersants. This property is especially significant for high quality heavy duty diesel oils which typically require high concentrations of dispersant additive. Furthermore, such improved viscosity properties facilitate the use of V.I. improvers in forming multigrade oils spanning a wider viscosity requirement range, such as 5W30 oils, due to the overall effect of lower viscosity increase at low temperatures while maintaining the desired viscosity at high temperatures as compared to the other dispersants. Such desired viscometric properties also permit the use of higher viscosity base stocks with attendant advantages in engine performance. Furthermore, the utilization of the dispersant additives of this invention is deemed to allow a reduction in the amount of V.I. improvers required.

The materials of this invention are thus deemed to constitute an improvement over conventional dispersants because of their effectiveness as dispersants coupled with enhanced low temperature viscometric properties. These materials are particularly useful with V.I. improvers in formulating multigrade oils.

More particularly, this invention provides improved oil-soluble dispersants formed by reacting (a) at least one dispersant having at least one primary or secondary amino group and/or at least one hydroxyl group, with (b) at least one polyolefinic compound substituted at each terminal position by a succinic group. The dispersants which constitute reactant (a) in forming the post-reacted dispersants of this invention preferably comprise members selected from the group consisting of (i) oil soluble salts, amides, imides, oxazolines and esters, or mixtures thereof, of long chain hydrocarbon substituted mono- and dicarboxylic acids or their anhydrides; (ii) long chain aliphatic hydrocarbon having a polyamine attached directly thereto; (iii) Mannich condensation products formed by condensing about a molar proportion of long chain hydrocarbon substituted phenol with about 1 to 2.5 moles of formaldehyde and about 0.5 to 2 moles of polyalkylene polyamine; and (iv) Mannich condensation products formed by reacting long chain hydrocarbon substituted mono- or dicarboxylic acids or their anhydrides with an amine-substituted hydroxy aromatic compound, preferably an aminophenol, which optionally may be hydrocarbyl-substituted to form a long chain hydrocarbon substituted amide- or imide-containing hydroxy aromatic intermediate adduct, and condensing the long chain hydrocarbon substituted amide- or imide-containing hydroxy aromatic intermediate adduct with an aldehyde such as formaldehyde -and a polyamine; wherein said long chain hydrocarbon group in (i), (ii), (iii) and (iv) is a polymer of a $C_2$ to $C_{10}$, e.g., $C_2$ to $C_5$ monoolefin, said polymer containing an average of about 35 to about 430 carbon atoms, (i.e. a polymer having a number average molecular weight of about 500 to about 6000), and preferably an average in the range of about 50 to about 180 carbon atoms (i.e., a polymer having a number average molecular weight of about 700 to about 2500). For ease of reference, reactant (a) of types (i), (ii), (iii) and (iv) above are sometimes referred to hereinafter either individually or collectively (as the case may be) as "adduct" or "adducts".

The reaction between reactants (a) and (b) above is deemed to increase the molecular weight of reactant (a) by coupling or linking of two or more molecules of reactant (a) by or through reactant (b). More particularly, it is believed that when reactant (a) contains at least one reactive (i.e., acylatable) primary and/or secondary amino group, the succinic groups of reactant (b) undergo reaction therewith to form imide or at least amide linkages, thus making possible at least some cross-linking between two or more molecules of reactant (a). Similarly, it is believed that when reactant (a) contains one or more free, suitably unhindered hydroxyl groups, as in a succinic ester dispersant formed from a polyol such as pentaerythritol, the succinic groups of reactant (b) undergo reaction therewith to form ester linkages, thus making possible at least some cross-linking between two or more molecules of reactant (a). It is also believed that when reactant (a) contains both one or more reactive primary and/or secondary amino groups and one or more unhindered hydroxyl groups, as in a succinic ester-amide dispersant formed from a polyol such as pentaerythritol and a polyamine such as tetraethylene pentamine, the reaction will tend to favor imide or amide formation through reaction of the succinic groups of reactant (b) with the amino groups of reactant (a). However reaction may also occur between a hydroxyl group of reactant (a) and a succinic group of reactant (b) whereby an ester linkage is formed. Whatever the reaction mechanisms involved, the net result of the reaction between reactants (a) and (b) above is the production of a dispersant product having enhanced properties. Thus, this invention is not intended to be, nor should this invention be construed to be, limited by theoretical considerations or particular reaction mechanisms.

Reactant (a)

The long chain hydrocarbyl substituted mono or dicarboxylic acid producing material, e.g., acid, anhydride, or ester, used in the invention to produce the nitrogen or ester containing adducts classified as (i) above includes the reaction product of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid wherein (a) the carboxyl groups are vicinal, (i.e., located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated to the carboxy group, i.e., of the structure

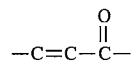

(iv) derivatives of (iii) such as $C_1$ to $C_5$ alcohol derived monoesters of (iii). Upon reaction with the polymer, the monounsaturation of the monounsaturated carboxylic reactant becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain unreacted polymer. The unreacted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e., increased or decreased by techniques known in the art, such modifications do not alter functionality as defined above. The terms "polymer substituted monocarboxylic acid material" and "polymer substituted dicarboxylic acid materials" as used herein are intended to refer to the product mixture whether it has undergone such modifications or not.

Accordingly, the functionality of the polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and the lower alkyl (e.g., $C_1$ to $C_4$ alkyl) acid esters of the foregoing, e.g., methyl maleate, ethyl fumarate, methyl fumarate, etc.

The hydrocarbyl-substituted mono- or dicarboxylic acid materials, as well as methods for their preparation, are well known in the art and are amply described in the patent literature. They may be obtained, for example, by the "ene" reaction between a polyolefin and an alpha-beta unsaturated $C_4$ to $C_{10}$ dicarboxylic acid, anhydride or ester thereof, such as fumaric acid, itaconic acid, maleic acid, maleic anhydride, chloromaleic acid, dimethyl fumarate, etc.

The hydrocarbyl-substituted dicarboxylic acid materials function as acylating agents for the adducts such as those comprised of a nitrogen containing moiety, e.g., polyamine, to form the acylated nitrogen derivatives of hydrocarbyl substituted dicarboxylic acids, anhydrides, or esters which are subsequently reacted with the polysuccinates—i.e., reactant (b)—to form the dispersants of this invention.

Preferred olefin polymers for reaction with the unsaturated dicarboxylic acid, anhydride, or ester are polymers comprising a major molar amount of C2 to $C_{18}$, e.g., $C_2$ to $C_5$, monoolefin. Such olefins include ethylene, propylene, butylene, isobutylene, pentene, 1-octene, styrene, etc. The polymers can be homopolymers such as polyisobutylene, polypropylene, polybutylene, etc., or they can be copolymers such as polymers of isobutylene and n-butylene; propylene and isobutylene; propylene, n-butylene, and isobutylene; isobutylene and 4-methyl-1-pentene; etc. Other copolymers include those in which a minor amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases the olefin polymer may be completely saturated, for example an ethylene-propylene copolymer made by a Ziegler-Natta synthesis using hydrogen as a moderator to control molecular weight.

The olefin polymers will usually have number average molecular weights ($\overline{Mn}$) within the range of about 500 and about 6000, e.g., 700 to 3000, preferably between about 800 and about 2500. An especially useful starting material for a highly potent dispersant additive made in accordance with this invention is polyisobutylene (also known as polyisobutene).

Processes for reacting the olefin polymer with the $C_4$–$C_{10}$ unsaturated dicarboxylic acid or monocarboxylic acid, anhydride or ester are known in the art. For example, the olefin polymer and the mono- or dicarboxylic acid material may be simply heated together as disclosed in U.S. Pat. Nos. 3,361, 673 and 3,401,118 to cause a thermal "ene" reaction to take place. Alternatively, the olefin polymer can be first halogenated, for example, chlorinated or brominated to about 1 to 8 wt. %, preferably 3 to 7 wt. chlorine or bromine, based on the weight of polymer, by passing the chlorine or bromine through the polyolefin at a temperature of 25° to 160° C., e.g., 120° C., for about 0.5 to 10, preferably 1 to 7 hours. The halogenated polymer may then be reacted with sufficient unsaturated acid or anhydride at 100° to 250° C., usually about 180° to 220° C., for about 0.5 to 10 hours, e.g., 3 to 8 hours, so the product obtained will contain an average of about 0.7 to 2.0 moles, preferably 1.0 to 1.3 moles, e.g., 1.2 moles, of the unsaturated acid per mole of the halogenated polymer. Processes of this general type are taught in U.S. Pat. Nos. 3,087,436; 3,172,892; 3,272,746 and others.

Alternatively, the olefin polymer and the unsaturated acid material are mixed and heated while adding chlorine to the hot material. Processes of this type are disclosed in U.S. Pat. Nos. 3,215,707; 3,231,587; 3,912,764; 4,110,349; 4,234, 435; and in U.K. 1,440,219.

By the use of halogen, about 65 to 95 wt. % of the polyolefin, e.g., polyisobutylene, will normally react with the mono- or dicarboxylic acid material. Upon carrying out a thermal reaction with the use of halogen or a catalyst, then usually only about 50 to 85 wt. % of the polyisobutylene will react. Chlorination helps increase the reactivity. For convenience, all of the aforesaid functionality ratios of dicarboxylic acid producing units to polyolefin, e.g., 1.0 to 2.0, etc. are based upon the total amount of polyolefin, that is, the total of both the reacted and unreacted polyolefin, present in the resulting product formed in the aforesaid reactions.

If desired, however, acidulation (e.g., succination) ratios may be employed in order to eliminate from consideration unreacted polyolefin. Acidulation ratios thus define the ratio of the average number of chemically bound acidic (e.g., succinic) groups per alkenyl group in the molecular structure of the acylating agent being used to form reactant (a). On this basis, the acidulation ratio (as determined by well known procedures) can fall in the range of from 1 to about 4, preferably from 1 to 2.5, more preferably from 1 to 1.6, and most preferably from 1 to 1.2.

Amine compounds useful as reactants with the hydrocarbyl substituted mono- or dicarboxylic acid material, i.e., acylating agent, are those containing at least two reactive amino groups, i.e., primary and secondary amino groups. They include polyalkylene polyamines, of about 2 to 60 (e.g. 2 to 30), preferably 2 to 40 (e.g. 3 to 20) total carbon atoms and about 1 to 12 (e.g., 2 to 9), preferably 3 to 12, and most preferably 3 to 9 nitrogen atoms in the molecule. These amines may be hydrocarbyl amines or may be hydrocarbyl amines including other groups, e.g., hydroxy group, and the like. Hydroxy amines with 1 to 6 hydroxy groups, preferably 1 to 3 hydroxy groups, are particularly useful. Such amines should be capable of reacting with the acid or anhydride groups of the hydrocarbyl substituted dicarboxylic acid moiety and with the succinic groups of reactant (b) through the amino functionality or a substituent group reactive functionality. Since tertiary amines are generally unreactive with anhydrides, it is desirable to have at least two primary and/or secondary amino groups on the amine. It is preferred that the amine contain at least one primary amino group, for reaction with the initial acylating agent, and at least one primary or secondary amino group, for reaction with reactant (b). Preferred amines are aliphatic saturated amines, including those of the general formula

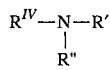 (I)

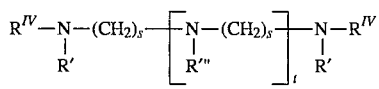 (Ia)

wherein $R^{IV}$, R', R" and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R" and R''' can additionally comprise a moiety of the formula

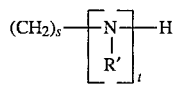 (Ib)

wherein R' is as defined above, and wherein each s and s' can be the same or a different number of from 2 to 6, preferably 2 to 4; and t and t' can be the same or different and are each numbers of typically from 0 to 10, preferably about 2 to 7, most preferably about 3 to 7, with the proviso that t+t' is not greater than 10. To assure a facile reaction it is preferred that $R^{IV}$, R', R", R''', s, s', t and t' be selected in a manner sufficient to provide the compounds of formula I with typically at least two primary and/or secondary amino groups. This can be achieved by selecting a compound in which at least one of said $R^{IV}$, R', R", or R''' groups is hydrogen or a compound in which t in formula Ia is at least one when R''' is H or when the Ib moiety possesses a secondary amino group. The most preferred amines of the above formulas are represented by formula Ia and contain at least two primary amino groups and at least one, and preferably at least two secondary amino groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 2,3-propylene diamine; di-(1,2-propylene)triamine; di-(1,3-propylene)triamine; N,N'-dimethyl-1,3-diaminopropane; N,N'-di-(2-aminoethyl)ethylene diamine; N,N'-di-(2-hydroxyethyl)-1,3-propylene diamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl) morpholine; and mixtures thereof.

Other useful amine compounds include alicyclic diamines such as 1,4-di(aminoethyl) cyclohexane, and N-aminoalkyl piperazines of the general formula:

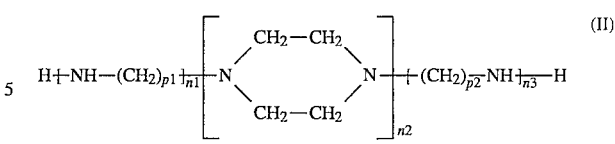 (II)

wherein $p_1$ and $p_2$ are the same or different and are each integers of from 1 to 4, and $n_1$, $n_2$ and $n_3$ are the same or different and are each integers of from 1 to 3.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylene tetramine, tetraethylene pentamine and corresponding piperazines. Low cost poly(ethyleneamine) compounds averaging about 5 to about 7 nitrogen atoms per molecule are available commercially under trade names such as "Polyamine H", "Polyamine 400", "Dow Polyamine E-100", Dow polyamine S-1107, etc.

Useful amines also include polyoxyalkylene polyamines such as those of the formula:

$NH_2$-alkylene-(O-alkylene)$_m$-$NH_2$ (III)

where m has a value of about 3 to 70 and preferably 10 to 35; and $R^V$-(alkylene-(O-alkylene)$_n$-$NH_2$)$_a$ (IV)

where n has a value of about 1 to 40, with the proviso that the sum of all the n's is from about 3 to about 70, and preferably from about 6 to about 35, and $R^V$ is a substituted saturated hydrocarbon radical of up to 10 carbon atoms, wherein the number of substituents on the $R^V$ group is from 3 to 6. The alkylene groups in either formula (III) or (IV) may be straight or branched chains containing about 2 to 7, and preferably about 2 to 4 carbon atoms.

The polyoxyalkylene polyamines of formulas (III) or (IV) above, preferably polyoxyalkylene diamines and polyoxyalkylene triamines, may have number average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade designation "Jeffamines D-230, D-400, D-1000, D-2000, T-403", etc.

The amine is readily reacted with the dicarboxylic acid material, e.g., alkenyl succinic anhydride, by heating an oil solution containing 5 to 95 wt.% of dicarboxylic acid material to about 100° to 200° C., preferably 125° to 175° C., generally for 1 to 10, e.g. 2 to 6 hours until the desired amount of water is removed. The heating is preferably carried out to favor formation of imides or mixtures of imides and amides, rather than amides and salts. Reaction ratios of dicarboxylic acid material to equivalents of amine as well as the other nucleophilic reactants described herein can vary considerably, depending upon the reactants and type of bonds formed. Generally from 0.1 to 1.0, preferably about 0.2 to 0.6, e.g. 0.4 to 0.6, moles of dicarboxylic acid moiety content (e.g. grafted maleic anhydride content) is used, per equivalent of nucleophilic reactant, e.g., amine. For example, about 0.8 mole of a pentamine (having two primary amino groups and 5 equivalents of nitrogen per molecule) is preferably used to convert into a mixture of amides and imides, the product formed by reacting one mole of olefin with sufficient maleic anhydride to add 1.6 moles of succinic anhydride groups per mole of olefin, i.e. preferably the pentamine is used in an amount sufficient to provide about 0.4 mole (that is, 1.6/[0.8×5] mole) of succinic anhydride moiety per nitrogen equivalent of the amine.

Tris(hydroxymethyl) amino methane (THAM) can be reacted with the aforesaid acid material to form amides, imides or ester type additives as taught by U.K. 984,409, or to form oxazoline compounds and borated oxazoline compounds as described, for example, in U.S. Pat. Nos. 4,102, 798; 4,116,876 and 4,113,639.

The adducts may also be esters derived from the aforesaid long chain hydrocarbon substituted compounds such as monohydric and polyhydric alcohols or aromatic compounds such as phenols and naphthols, etc. The polyhydric alcohols are the most preferred hydroxy compounds.

Suitable polyol compounds which can be used include aliphatic polyhydric alcohols containing up to about 100 carbon atoms and about 2 to about 10 hydroxyl groups. These alcohols can be quite diverse in structure and chemical composition, for example, they can be substituted or unsubstituted, hindered or unhindered, branched chain or straight chain, etc. as desired. Typical alcohols are alkylene glycols such as ethylene glycol, propylene glycol, trimethylene glycol, butylene glycol, and polyglycol such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol, monomethyl ether of glycerol, pentaerythritol, dipentaerythritol, tripentaerythritol, 9,10-dihydroxystearic acid, the ethyl ester of 9,10-dihydroxystearic acid, 3-chloro-1,2-propanediol, 1,2-butanediol, 1,4-butanediol, 2,3-hexandediol, pinacol, tetrahydroxy pentane, erythritol, arabitol, sorbitol, mannitol, 1,2-cyclohexanediol, 1,4-cyclohexanediol, 1,4-(2-hydroxyethyl)cyclohexane, 1,4-dihydroxy-2-nitrobutane, 1,4-di(2-hydroxyethyl)benzene, the carbohydrates such as glucose, rhamnose, mannose, glyceraldehyde, and galactose, and the like, amino alcohols such as di-(2-hydroxyethyl)amine, tri-(3-hydroxypropyl)amine, N,N-di-(hydroxyethyl) ethylenediamine, copolymer of allyl alcohol and styrene, N,N-di-(2-hydroxyethyl)glycine and esters thereof with lower mono- and polyhydric aliphatic alcohols, etc.

Included within the group of aliphatic alcohols are those alkane polyols which contain ether groups such as polyethylene oxide repeating units, as well as those polyhydric alcohols containing at least three hydroxyl groups, at least one of which has been esterified with a monocarboxylic acid having from 8 to about 30 carbon atoms such as octanoic acid, oleic acid, stearic acid, linoleic acid, dodecanoic acid, or tall oil acid. Examples of such partially esterified polyhydric alcohols are the mono-oleate of sorbitol, the mono-oleate of glycerol, the mono-stearate of glycerol, the di-stearate of sorbitol, and the di-dodecanoate of erythritol.

A preferred class of ester containing adducts are those prepared from aliphatic alcohols containing up to 20 carbon atoms, and especially those containing 3 to 15 carbon atoms. This class of alcohols includes glycerol, erythritol, pentaerythritol, dipentaerythritol, tripentaerythritol, gluconic acid, glyceraldehyde, glucose, arabinose, 1,-7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis(hydroxymethyl)cyclohexanol, 1,10-decanediol, digitalose, and the like. The esters prepared from aliphatic alcohols containing at least three hydroxyl groups and up to fifteen carbon atoms are particularly preferred.

An especially preferred class of polyhydric alcohols for preparing the ester adducts used as starting materials in this invention are the polyhydric alkanols containing 3 to 15, especially 3 to 6 carbon atoms and having at least 3 hydroxyl groups. Such alcohols are exemplified in the above specifically identified alcohols and are represented by glycerol, erythritol, pentaerythritol, mannitol, sorbitol, 1,2,4-hexanetriol, and tetrahydroxy pentane and the like.

The ester adducts may be diesters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester adduct may be prepared by one of several known methods as illustrated for example in U.S. Pat. No. 3,381,022. The ester adduct may also be borated, similar to the nitrogen containing adduct, as described herein.

Hydroxyamines which can be reacted with the aforesaid long chain hydrocarbon substituted dicarboxylic acid material to form adducts include 2-amino-2-methyl-1-propanol, p-(beta-hydroxyethyl)aniline, 2-amino-1-propanol, 3-amino-1-propanol, 2-amino-2-methyl-1,3-propane-diol, 2-amino-2-ethyl-1,3-propanediol, N-(beta-hydroxypropyl)-N'-(beta-amino-ethyl -(beta-amino-ethyl)piperazine,tris(hydroxymethyl)aminomethane also known as tris-methylolaminomethane), 2-amino-1-butanol, ethanol-amine, diethanolamine, triethanolamine, beta-(beta-hydroxyethoxy)-ethylamine and the like. Mixtures of these or similar amines can also be employed. The above description of nucleophilic reactants suitable for reaction with the hydrocarbyl substituted dicarboxylic acid or anhydride includes amines, alcohols, and compounds of mixed amine and hydroxy containing reactive functional groups, i.e. aminoalcohols.

Also useful as nitrogen containing adducts which are reacted with reactant (b) to form the improved dispersants of this invention are the adducts of group (ii) above wherein a nitrogen containing polyamine is attached directly to the long chain aliphatic hydrocarbon as shown in U.S. Pat. Nos. 3,275,554 and 3,565,804 where the halogen group on the halogenated hydrocarbon is displaced with various alkylene polyamines.

Another class of nitrogen containing adducts which are reacted with reactant (b) to produce the dispersants of this invention are the adducts of group (iii) above which contain Mannich base or Mannich condensation products as they are known in the art. Mannich condensation products of this type generally are prepared by condensing about 1 mole of a high molecular weight hydrocarbyl substituted hydroxy aromatic compound (e.g., having a number average molecular weight of 700 or greater) with about 1 to 2.5 moles of an aldehyde such as formaldehyde or paraformaldehyde and about 0.5 to 2 moles polyalkylene polyamine as disclosed, e.g., in U.S. Pat. Nos. 3,442,808; 3,649,229 and 3,798,165. Such Mannich condensation products may include a long chain, high molecular weight hydrocarbyl on the phenol group or may be reacted with a compound containing such a hydrocarbon, e.g., polyalkenyl succinic anhydride as shown in the aforementioned U.S. Pat. No. 3,442,808.

The hydrocarbyl substituted hydroxy aromatic compounds used in the preparation of the Mannich base include those compounds having the formula

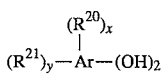

wherein Ar represents

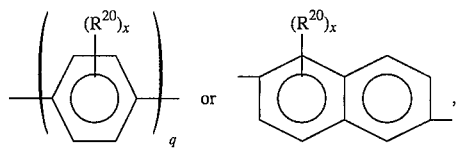

wherein q is 1 or 2, $R^{21}$ is a long chain hydrocarbon, $R^{20}$ is a hydrocarbon or substituted hydrocarbon radical having from 1 to about 3 carbon atoms or a halogen radical such as the bromide or chloride radical, y is an integer from 1 to 2, x is an integer from 0 to 2, and z is an integer from 1 to 2.

Illustrative of such Ar groups are phenylene, biphenylene, naphthalene and the like.

The preferred long chain hydrocarbon substituents represented by $R^{21}$ are olefin polymers comprising a major molar amount of $C_2$ to $C_8$, e.g., $C_2$ to $C_5$ monoolefin. Such olefins include ethylene, propylene, butylene, pentene, 1-octene, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers is derived from a diene, e.g., a copolymer of isobutylene and butadiene; or a copolymer of ethylene, propylene and 1,4-hexanediene; etc.

In some cases, the olefin polymer may be completely saturated, for example, an ethylene-propylene copolymer made by a Ziegler-Natta synthesis using hydrogen as a moderator to control molecular weight.

The olefin polymers will usually have a number average molecular weight ($\overline{mn}$) within the range of about 700 to about 10,000, more usually between about 700 and about 5,000. Particularly useful olefin polymers have number average molecular weight within the range of about 700 to about 3,000, and more preferably within the range of about 900 to about 2,500 with approximately one terminal double bond per polymer chain. An especially useful starting material for a highly potent dispersant additive made in accordance with this invention is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Gly, "Modern Size Exclusion Liquid Chromatography", John Wiley and Sons, New York, 1979.

Processes for substituting the hydroxy aromatic compounds with the olefin polymer are known in the art and be depicted as

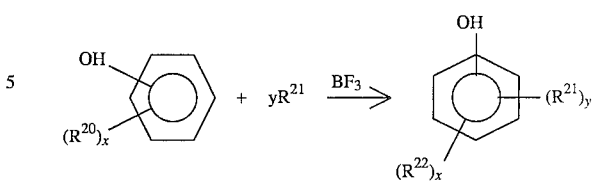

where $R^{20}$, $R^{21}$, y and x are as previously defined, and $BF_3$ is an alkylating catalyst. Processes of this type are described, for example, in U.S. Pat. Nos. 3,539,633 and 3,649,229.

Representative hydrocarbyl substituted hydroxy aromatic compounds contemplated for use in this invention include, but are not limited to, 2-polypropenyl phenol, 3-polypropenyl phenol, 4-polypropenyl phenol, 2-polybutenyl phenol, 3-polyisobutenyl phenol, 4-polyisobutenyl phenol, 4-polyisobutenyl phenol, 4-polyisobutenyl phenol, 4-polyisobutenyl-2-chlorophenol, 4-polyisobutenyl-2-methylphenol, and the like.

Suitable hydrocarbyl-substituted polyhydroxy aromatic compounds include the polyolefin-substituted catechols, the polyolefin-substituted resorcinols, and the polyolefin-substituted hydroquinones, e.g., 4-polyisobutenyl-1,2-dihydroxybenzene, 3-polypropenyl-1,2-dihydroxybenzene, 5-polyisobutenyl-1,3-dihydroxybenzene, 4-polyamylenyl-1,3-dihydroxybenzene, and the like.

Suitable hydrocarbyl-substituted naphthols include 1-polyisobutylene-5-hydroxynaphthalene, 1-polypropylene-3-hydroxynaphthalene, and the like.

The preferred long chain hydrocarbyl substituted hydroxy aromatic compounds to be used in this invention can be illustrated by the formula

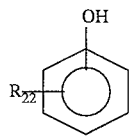

wherein $R^{22}$ is hydrocarbyl of from 50 to 300 carbon atoms, and preferably is a polyolefin derived from a $C_2$ to $C_{10}$ (e.g., $C_2$ to $C_5$) mono-alpha-olefin.

The aldehyde material which can be employed in the production of the Mannich case is represented by the formula:

$R^{23}CHO$ in which $R^{23}$ is a hydrogen or an aliphatic hydrocarbon radical having from 1 to 4 carbon atoms. Examples of suitable aldehydes include formaldehyde, paraformaldehyde, acetaldehyde and the like.

Yet another class of nitrogen-containing adducts which are reacted with reactant (b) to produce the dispersants of this invention are the adducts of group (iv) which contain Mannich base aminophenol-type condensation products as they are known in the art. Such Mannich condensation products (iv) generally are prepared by reacting about 1 mole of long chain hydrocarbon substituted mono and dicarboxylic acids or their anhydrides with about 1 mole of amine-substituted hydroxy aromatic compound, preferably, aminophenol, which aromatic compound can also be halogen- or hydrocarbyl-substituted, to form a long chain hydrocarbon substituted amine or imide-containing hydroxy aromatic intermediate adduct and condensing about a molar proportion of the long chain hydrocarbon substituted amide- or imide-containing hydroxy aromatic intermediate adduct with about 1 to 2.5 moles of formaldehyde and about 0.5 to 2 moles of polyamine, e.g., polyalkylene polyamine.

The amine substituted hydroxy aromatic compounds of this invention may be represented by the general formula

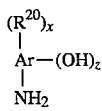

PS $R^{20}$, x and z are as defined hereinabove. Preferred compounds are those wherein z is one.

The optionally-hydrocarbyl substituted hydroxy aromatic compounds used in the preparation of the Mannich base products (iv) include those compounds having the formula

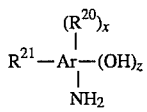

wherein ar, $R^{21}$, $R^{20}$, x and z are as defined above. Preferred compounds are those wherein z is one.

Preferred N-(hydroxyaryl) amine reactants to be used in forming a Mannich Base product (iv) for use in this invention are amino phenols of the formula

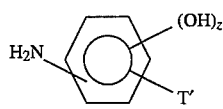

in which T' is hydrogen, an alkyl radical having from 1 to 3 carbon atoms, or a halogen radical such as the chloride or bromide radical and z is one or two. Preferred aminophenols are those wherein T' is hydrogen and/or z is one.

Suitable aminophenols include 2-aminophenol, 3-aminophenol, 4-aminophenol, 4-amino-3-methylphenol, 4-amino-3-chlorophenol, 4-amino- 2-bromophenol and 4-amino-3-ethylphenol.

Suitable amino-substituted polyhydroxyaryls are the aminocatechols, the amino resorcinols, and the aminohydroquinones, e.g., 4-amino--1,2-dihydroxybenzene, 3-amino-1, 2-dihydroxybenzene, 5-amino-1,3-dihydroxybenzene, 4-amino-1,3-dihydroxybenzene, 2-amino-1,4-di-hydroxybenzene, 3-amino-1,4-dihydroxybenzene and the like.

Suitable aminonaphthols include 1-amino-5-hydroxynaphthalene, 1-amino-3-hydroxynaphthalene and the like.

The long chain hydrocarbyl substituted mono- or dicarboxylic acid or anhydride materials useful for reaction with the hydroxy and amine-substituted aromatic compound to prepare the amide or imide intermediates in the formation of Reactant (iv) can comprise any of those described above which are useful in preparing the reactant or adduct (i). The foregoing intermediates of the long chain hydrocarbyl substituted mono- or dicarboxylic acids or anhydride materials and the hydroxy and amine-substituted aromatic compound are then contacted with an aldehyde and amine for the Mannich Base reaction as described above. The aldehyde and amine can comprise any of those described above as being useful in formation of the Reactant (iii) materials.

In one preferred aspect of this invention, the dispersant adducts (iv) are prepared by reacting the olefin polymer substituted mono- or dicarboxylic acid material with the N-(hydroxyary) amine material to form a carbonyl-amino material containing at least one group having a carbonyl group bonded to a secondary or a tertiary nitrogen atom. In the amide form, the carbonyl-amino material can contain one or two —C(O)—NH-groups, and in the imide form the carbonyl-amino material will contain —C(O)—N—C(O)— groups. The carbonyl-amino material can therefore comprise N-(hydroxyaryl) polymer-substituted dicarboxylic acid diamide, N-(hydroxyaryl) polymer-substituted dicarboxylic acid imide, N-(hydroxyaryl) polymer-substituted monocarboxylic acid monoamide, N-(hydroxyaryl) polymer-substituted dicarboxylic acid monoamide or a mixture thereof.

In general, amounts of the olefin polymer substituted mono- or dicarboxylic acid material, such as olefin polymer substituted succinic anhydride, and of the N-hydroxyaryl amine, such as p-aminophenol, which are sufficient to provide about one equivalent of di-carboxylic acid or anhydride moiety or monocarboxylic acid moiety per equivalent of amine moiety are dissolved in an inert solvent (i.e., a hydrocarbon solvent such as toluene, xylene, or isooctane) and reacted at a moderately elevated temperature up to the reflux temperature of the solvent used, for sufficient time to complete the formation of the intermediate N-(hydroxyaryl) hydrocarbyl amide or imide. When an olefin polymer substituted monocarboxylic acid material is used, the resulting intermediate which is generally formed comprises amide groups. Similarly, when an olefin polymer substituted dicarboxylic acid material is used, the resulting intermediate generally comprises imide groups, although amide groups can also be present in a portion of the carbonyl-amino material thus formed. Thereafter, the solvent is removed under vacuum at an elevated temperature, generally, at approximately 160° C. (1 mm).

Alternatively, the intermediate is prepared by combining amounts of the olefin polymer substituted mono- or dicarboxylic acid material which are sufficient to provide about one equivalent of acid moiety, i.e., dicarboxylic acid moiety, dicarboxylic acid anhydride moiety, or monocarboxylic acid moiety per equivalent of amine moiety/ of the N-(hydroxyaryl)amine and the N-(hydroxyaryl) amine, and heating the resulting mixture at elevated temperature under a nitrogen purge in the absence of solvent.

The resulting N-(hydroxyaryl) polymer substituted imides can be illustrated by the succinimides of the formula

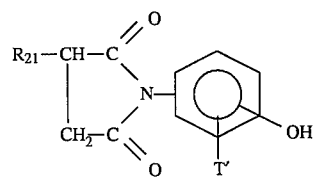

wherein T' is as defined above, and wherein $R^{21}$ is as defined above. Similarly, when the olefin polymer substituted monocarboxylic acid material is used the resulting N-(hydroxyaryl) polymer substituted amides can be represented by the propionamides of the formula:

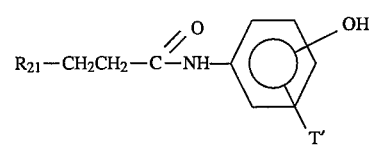

wherein T' and $R^{21}$ are as defined above.

In a second step, the carbonyl-amino intermediate is reacted with an amine compound (or mixture of amine compounds), such as a polyfunctional amine, together with an aldehyde (e.g., formaldehyde) in the Mannich base reaction. In general, the reactants are admixed and reacted at an elevated temperature until the reaction is complete. This reaction may be conducted in the presence of a solvent and in the presence of a quantity of mineral oil which is an effective solvent for the carbonyl-amino intermediate and for the finished Mannich base dispersant material. This second step can be illustrated by the Mannich base reaction between the above N-(hydroxyphenyl) polymer succinimide intermediate, paraformaldehyde and ethylene diamine in accordance with the following equation:

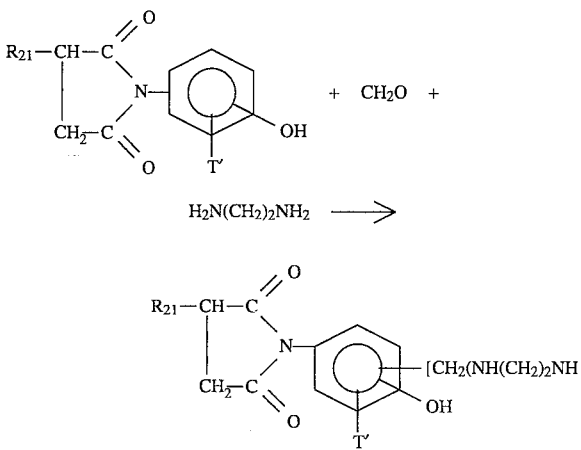

wherein a is an integer of 1 or 2, $R^{21}$ and T' are as defined above, and $D^1$ is H or the moiety

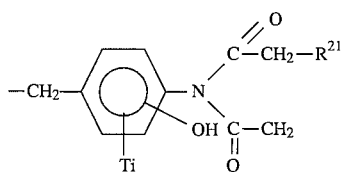

Similarly, this second step can be illustrated by the Mannich base reaction between the above N-(hydroxyphenyl) polymer acrylamide intermediate, paraformaldehyde and ethylene diamine in accordance with the following equation:

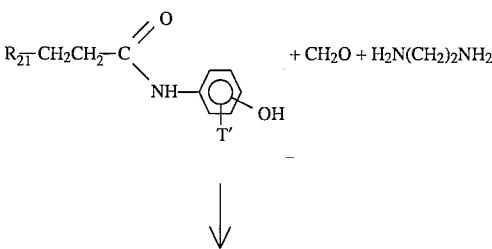

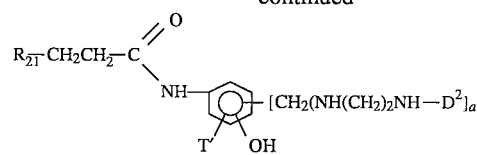

wherein a' is an integer of or 2, $R^{21}$ and R' are as defined above, and $D^2$ is H or the moiety

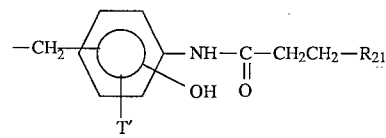

Generally, the reaction of one mole of the carbonyl-amino material, e.g., a N-(hydroxyaryl) polymer succinimide or amide intermediate, with two moles of aldehyde and one mole of amine will favor formation of the products comprising two moieties of said intermediate bridged by an -alk-amine-alk- group wherein the "alk" moieties are derived from the aldehyde (e.g., —$CH_2$— from $CH_2O$) and the "amine" moiety is a bivalent bis-N terminated amino group derived from the amine reactant (e.g., from polyalkylene polyamine). Such products are illustrated by Equations A and B above wherein "a" is one, $D^1$ is the moiety

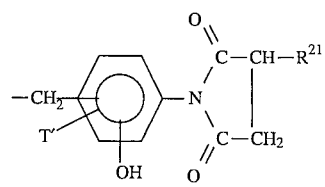

and $D^2$ is the moiety

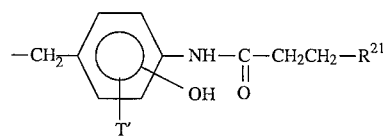

wherein T' and $R^{21}$ are as defined above.

In a similar manner, the reaction of substantially equimolar amounts of the carbonyl-amino material, aldehyde and amine reactant favors the formation of products illustrated by Equations A and B wherein "a'" is one and $D^1$ and $D^2$ are each H, and the reaction of one mole of carbonyl-amino material with two moles of aldehyde and two mole of the reactant permits the formation of increased amounts of the products illustrated by Equations A and B wherein "a'" is 2 and $D^1$ and $D^2$ are each H.

In preparing Reactants (iv), the order of reacting the various reactants can be modified such that, for example, the N-hydroxyaryl amine is first admixed and reacted with the amine material and aldehyde in the Mannich base reaction to form an aminomethyl hydroxyaryl amine material. Thereafter, the resulting intermediate adduct is reacted with the olefin polymer substituted mono- or dicarboxylic acid material to form the desired dispersant. The sequence of reactions performed in accordance with this aspect of the invention tends to result in the formation of various dispersant isomers because of the plurality of aromatic materials formed in the first Mannich base condensation step and the primary and secondary nitrogen atoms which are available for reaction with the carboxy moieties of the mono- or dicarboxylic acid materials.

The Mannich base intermediate adduct (iv) formed by the reaction of the N-hydroxyaryl amine with the amine reactant and formaldehyde can comprise at least one compound selected from the group consisting of:

(a) adducts of the structural formula:

$$H\text{—}(A\text{—}A')_{x1}\text{—}Ar'A'\text{—}A\text{—}(A'Ar'A'A)_{x2}\text{—}(A'Ar')_{x3}\text{—}H \qquad (VI)$$

wherein $x_1$ is 0 or $x_2$ is an integer of 0 to 8, $x_3$ is 0 or 1, "A" is a bivalent bis-N terminated amino group derived from the amine reactant and comprises an amine group containing from 2 to 60 (preferably from 2 to 40) carbon atoms and from 1 to 12 (preferably from 3 to 13) nitrogen atoms, and A' comprises the group —CH(T")— wherein T" is H or alkyl of from 1 to 9 carbon atoms and is derived from the corresponding aldehyde reactant, and Ar' comprises the moiety:

wherein T' and Ar are as defined above for the N-hydroxyaryl amines employed in this invention; and (b) adducts of the structure:

wherein "a'", T', A', A and Ar are as defined above. Preferred adducts of formula XXII above are those wherein $x_1$ is O, $x_2$ is 1 to 3, and $x_3$ is 1, and most preferably wherein T' is H or alkyl of 1 to 3 carbon atoms, Ar is phenylene. Preferred adducts of this type are those wherein Ar is phenylene.

Preferably, the "A" bivalent amino group will comprise terminal —NH— groups, as exemplified by the structures of the formula:

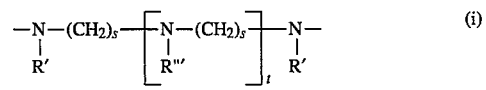

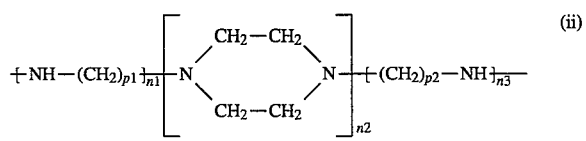

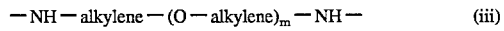

wherein R', R''' and "S" are as defined above with respect to Formula I; $p_1$, $p_2$, $n_1$, $n_2$, and $n_3$ are as defined above with respect to Formula II; "alkylene" and "m" are as defined above with respect to Formula III.

Illustrative adducts of structure (VIA) are set forth in Table A below:

TABLE A

| $x_1$ | $x_2$ | $x_3$ | Ar' | A' | A |
|---|---|---|---|---|---|
| 0 | 2 | 1 | —Ph(OH)(NH$_2$)— | —CH$_2$— | —NH(CH$_2$)$_2$NH(CH$_2$)$_2$NH— |
| 0 | 2 | 1 | " | " | —NH(CH$_2$)$_2$(NH(CH$_2$)$_2$)$_3$NH— |
| 0 | 1 | 0 | " | " | —NH(CH$_2$)$_2$NH(CH$_2$)$_2$NH— |
| 0 | 0 | 0 | " | " | —NH(CH$_2$)$_2$(NH(CH$_2$)$_2$)$_3$NH— |
| 0 | 1 | 1 | " | " | —NH(CH$_2$)$_2$NH(CH$_2$)$_2$NH— |
| 0 | 1 | 1 | " | " | —NH(CH$_2$)$_2$(NH(CH$_2$)$_2$)$_3$NH— |
| 1 | 2 | 0 | " | —CH(CH$_3$)— | —NH(CH$_2$)$_2$NH(CH$_2$)$_2$NH— |
| 1 | 0 | 1 | " | " | —NH(CH$_2$)$_2$(NH(CH$_2$)$_2$)$_5$NH— |
| 1 | 3 | 0 | " | " | —NH(CH$_2$)$_2$NH(CH$_2$)$_5$NH |
| 1 | 1 | 0 | " | " | —NH(CH$_2$)$_2$(NH(CH$_2$)$_2$)$_5$NH— |
| 1 | 1 | 1 | " | " | —NH(CH$_2$)$_2$NH(CH$_2$)$_5$NH— |
| 0 | 2 | 1 | " | " | —NH(CH$_2$)$_2$(NH(CH$_2$)$_2$)$_6$NH— |

(Ph = phenyl)

Illustrative adducts of structure (VII) are set forth below in Table B wherein AR is tri- or tetra-substituted phenyl:

For the sake of illustration, this aspect of the invention may be represented by the following equations (wherein $R^{2l}$, T' and "a'" are as defined above):

TABLE B

| a' | T' | A' | A |
|---|---|---|---|
| 1 | H | —CH$_2$— | —NH(CH$_2$)$_2$NH(CH$_2$)$_2$NH— |
| 2 | CH$_3$ | " | —NH(CH$_2$)$_2$(NH(CH$_2$)$_2$)$_3$NH— |
| 1 | CH$_3$ | " | —NH(CH$_2$)$_2$NH(CH$_2$)$_2$NH— |
| 2 | C$_2$H$_5$ | " | —NH(CH$_2$)$_2$(NH(CH$_2$)$_2$)$_5$NH— |
| 1 | C$_3$H$_7$ | " | —NH(CH$_2$)$_2$NH(CH$_2$)$_5$NH— |
| 2 | C$_4$H$_9$ | " | —NH(CH$_2$)$_2$(NH(CH$_2$)$_2$)$_6$NH— |
| 1 | H | —CH(CH$_3$)— | —NH(CH$_2$)$_2$NH(CH$_2$)$_4$NH— |
| 2 | CH$_3$ | " | —NH(CH$_2$)$_2$(NH(CH$_2$)$_2$)$_5$NH— |

In one embodiment of the preparation of Reactants (iv), a carbonyl-amino material comprising a polyisobutylene substituted hydroxyaryl succinimide, which has been prepared by first reacting a polyisobutylene succinic anhydride with an aminophenol to form an intermediate product, is reacted with formaldehyde and a mixture of poly(ethyleneamines) in the Mannich base reaction as outlined above to form an intermediate material containing from one to three (polyamino)methyl-substituted aminohydroxy aryl groups per molecule, followed by reacting this intermediate with a polyisobutylene succinic anhydride to form the Mannich Base (iv) adducts. A preferred group of Mannich Base (iv) adducts are those formed by condensing polymer with formaldehyde and polyethylene amines, e.g., tetraethylene pentamine, pentaethylene hexamine, polyoxyethylene and polyoxypropylene amines, e.g., polyoxypropylene diamine, and combinations thereof. One particularly preferred dispersant combination involves a condensation of (a") polymer substituted succinic anhydride or propionic acid, (b") aminophenol, (c") formaldehyde, and (d") at least one of (d"$_1$) a polyoxyalkylene polyamine, e.g., polyoxypropylene diamine, and (d"2) a polyalkylene polyamine, e.g., polyethylene diamine and tetraethylene pentamine, using a a":b":c":d" molar ratio of 1:1–8:1:0–0.1–10 and preferably 1:2–6:1:1–4, wherein the a":(d"$_1$):(d"$_2$) molar ratio is 1:0–5:0–5, and preferably 1:0–4:1–4.

Most preferably, when the aldehyde comprises formaldehyde (or a material which generates formaldehyde in situ), and the amine In a preferred embodiment of this invention the adducts which are post-reacted with reactant (b) to form the dispersants of this invention are the adducts of type (i) above, especially where the adduct contains at least one acylatable primary or secondary amino group, as in the well known succinimide or succinic ester-amide type dispersants. Such dispersants are nomenclatured, in the specification and claims, as acylated nitrogen derivatives of hydrocarbyl substituted dicarboxylic acid forming material being nomenclatured as an acylating agent or material. Particularly preferred adducts of this type are those derived from polyisobutylene substituted with succinic anhydride groups and reacted with Dicarboxylic acid materials:

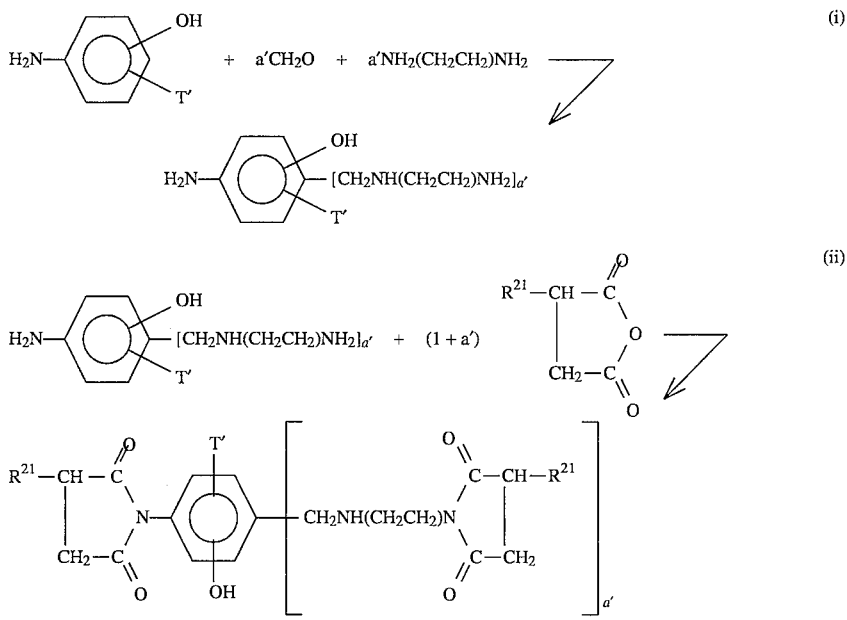

Monocarboxylic acid materials:

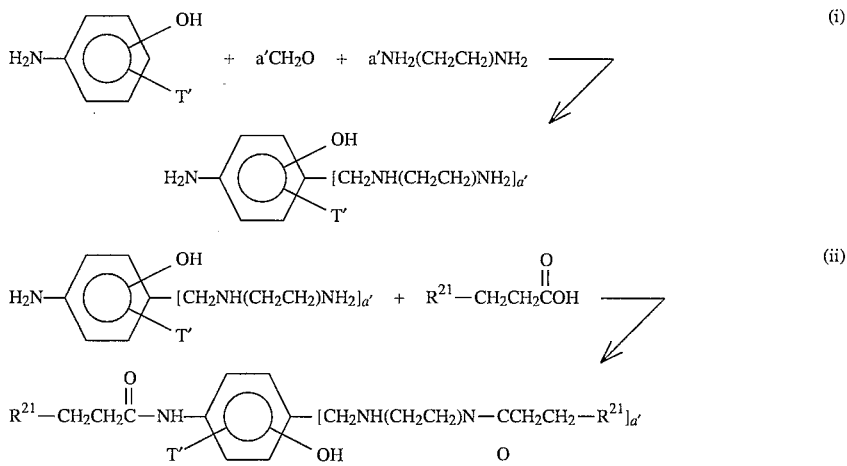

comprises a di-primary amine (e.g., polyalkylene polyamine), the formaldehyde and diprimary amine are employed in an amount of about 2(n−1) moles of formaldehyde and about (n−1) moles of diprimary amine per "n" molar equivalents charged of the hydroxyaryl group.

polyethylene amines, e.g., tetraethylene pentamine, pentaethylene hexamine, polyoxyethylene and polyoxypropylene amines, e.g., polyoxypropylene diamine, trismethylolaminoethane and combinations thereof. Most of these various amines are available in the form of commercial grade mixtures, and such mixtures are preferred for use because of their suitable properties and lost cost. For example, and as those skilled in the art well know, commercial mixtures often simply named "triethylene tetramine", "tetraethylene pentamine", "pentaethylene hexamine", etc. are actually mixtures of polyethylene polyamines including straight and branched chain species and cyclic species. In overall composition such polyethylene polyamines approximate the composition by which they are named. It is of course possible through use of rigorous synthesis and/or purification procedures to prepare highly pure "triethylene tetramine", "tetraethylene pentamine", "pentaethylene hexamine", etc and these materials can be used if desired. Thus in the specification and claims hereof such terms as "triethylene tetramine", "tetraethylene pentamine", "pentaethylene hexamine", etc should be understood to include individually and collectively the pure compounds so named and the commercial type mixtures of polyethylene polyamines which have overall compositions approximating the composition of the named compound.

Utilizing this preferred group of nitrogen containing adducts the dispersants of this invention may be characterized as acylated nitrogen derivatives of hydrocarbyl substituted dicarboxylic materials comprising the reaction products of:

(A) reaction products of (1) a long chain hydrocarbyl substituted dicarboxylic acid producing material, and (2) a polyamine; subsequently reacted with (B) at least one polyolefinic compound substituted at each terminal position by a succinic group.

Reactant (b)

Substantially aliphatic polyolefinic compounds substituted at each terminal position by a succinic group are employed as reactant (b) in forming the dispersants of this invention. In general such compounds may be depicted by the formula

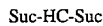 Formula VIII where "Suc" represents a succinic group, e.g., a succinic ester group, or a succinic acyl halide group or, preferably, a succinic acid or succinic anhydride group, and HC represents an aliphatic or substantially aliphatic divalent hydrocarbyl group derived from one or more aliphatic or substantially aliphatic $C_{2-10}$ olefins, and preferably one or more $C_{3-6}$ 1-alkenes, most preferably isobutene. These compounds can be formed by reacting an aliphatic or substantially aliphatic hydrocarbon having olefinic unsaturation in the alpha and omega positions with an acid reactant of the formula

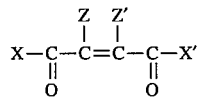 Formula IX wherein X and X' can be the same as each other or can be different from each other, and are —OH; —O-hydrocarbyl; —$O^-$ $M^+$ where $M^+$ represents one equivalent of a metal, ammonium or amine cation; —$NH_2$: —Cl: —Br: and X and X' taken together can be —O— so as to form the anhydride. and Z and Z' can be the same as each other or can be different from each other, and are hydrogen atoms, halogen atoms or hydrocarbyl groups such as $C_{1-24}$ hydrocarbyl groups; all with the proviso that such acid reactant can function as a conventional acylating agent and thus react with the alpha and omega olefinic bonds of the foregoing aliphatic or substantially aliphatic hydrocarbon. Illustrative examples of such compounds include maleic acid, maleic anhydride, fumaric acid, citraconic anhydride, citraconic acid, mesaconic acid, dimethyl maleic acid, dimethyl maleic anhydride, ethylmaleic acid, ethylmaleic acid, the lower alkyl (e.g., $C_{1-6}$ alkyl) esters of such acids, and the like. Use of maleic acid is preferred, and use of maleic anhydride is particularly preferred.

It will thus be seen that the terminal succinic group "Suc" in Formula VIII given above may carry one or more substituents corresponding to Z and/or Z' in Formula IX above, such as hydrocarbyl (e.g., alkyl or alkenyl substituents) or halogen atoms present in the original acylating agent from which the succinic group was formed. In short, the terminal "Suc" groups correspond in structure to the succinic or substituted succinic group formed by reaction (adduction) of the reactant of formula IX with the olefinic unsaturation in the alpha and omega positions of the aliphatic or substantially aliphatic hydrocarbon.

Preferred compounds for use as reactant (b) are those formed by reacting a compound of Formula IX above, especially maleic anhydride, with a telechelic compound having two olefinic end groups (i.e., two terminal methylene groups, $CH_2$=), and in which the principal aliphatic chain corresponds to a polymer or oligomer of a $C_{2-10}$ 1-alkene, preferably a $C_{3-6}$ 1-alkene, and most preferably isobutene. Procedures such as are referred to in, (and including references cited in or on the face page of) Bender et al U.S. Pat. No. 5,053,462 can be used or modified for use in forming such compounds. All disclosure of the aforesaid Bender et al patent and all disclosures of each and every reference cited in the text of the Bender et al patent or on the face page of the aforesaid Bender et al patent are expressly incorporated herein by reference to the extent such disclosures relate to any telechelic compound, any method or procedure for forming any telechelic compound, any method of converting a telechelic compound into a compound having an olefinic double bond at each terminal position thereof, any method of converting a telechelic compound into a compound having a succinic group at each terminal position thereof, and/or any aliphatic compound having a succinic group at each terminal position thereof. The preferred telechelic compounds contain an average of less than about 80 carbon atoms, more preferably an average of 60 carbon atoms or less, and most preferably an average of 50 carbon atoms or less. However telechelic compounds containing as many as 5000 carbon atoms can be used, if desired.

The most preferred compounds for use as reactant (b) are the modified isobutene polymers of the general structure (I) as set forth and described in the aforesaid Bender et al patent. Such compounds can be formed by carbocationic polymerization of isobutene with 2,2,5,5-tetramethyldihydrofuran, methylene chloride and boron trichloride catalyst to form a Cl—$C(CH_3)_2$—$CH_2$— telechelic, followed by dehydrochlorination with a reagent such as potassium tert-butoxide to form a vinylidene terminated telechelic, $CH_2$=$C(CH_3)$ —$CH_2$—, and subsequent reaction of the vinylidene-terminated telechelic with maleic anhydride. Procedures which can be used or adapted for use in forming such modified isobutene polymers are described for example in U.S. Pat. No. 5,053,462. Note for instance the typical procedure given in Examples 1 through 3 thereof.

Thus in accordance with preferred embodiments of this invention, there is provided an oil-soluble dispersant formed by reacting (a) at least one dispersant having at least one primary or secondary amino group and/or at least one hydroxyl group, preferably a type (i) adduct, and most preferably a hydrocarbyl-substituted succinimide of a polyamine (especially an alkylene polyamine and/or a polyoxyalkylene polyamine) or a hydrocarbyl-substituted succinic ester-amide of a polyol (especially pentaerythritol and/or tris(hydroxymethyl)aminomethane) and a polyamine (especially an alkylene polyamine and/or a polyoxyalkylene polyamine) with (b) at least one compound formed by reacting a compound of Formula IX above, especially maleic anhydride, with a telechelic compound having two olefinic end groups, which telechelic compound is produced by carbocationic oligomerization or carbocationic polymerization of a $C_{2-10}$ 1-alkene, preferably a $C_{3-6}$ 1-alkene, and most preferably isobutene, and an olefinic initiator followed by dehydrohalogenation of the halogen atom terminated telechelic so formed.

In accordance with particularly preferred embodiment of this invention, there is provided an oilsoluble dispersant formed by reacting (a) at least one dispersant having at least one primary or secondary amino group and/or at least one hydroxyl group, preferably a type (i) adduct, and most preferably a hydrocarbyl-substituted succinimide of a polyamine (especially an alkylene polyamine and/or a polyoxyalkylene polyamine) or a hydrocarbyl-substituted succinic ester-amide of a polyol (especially pentaerythritol and/or tris(hydroxymethyl)aminomethane) and a polyamine (especially an alkylene polyamine and/or a polyoxyalkylene polyamine) with (b) at least one modified polymer f isobutene of the formula

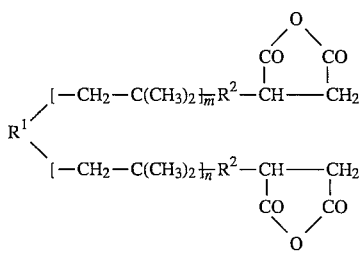

where $R^1$ is an olefinically unsaturated divalent radical, preferably a divalent-radical of the structure

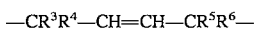

where each of $R^3$, $R^4$, $R^5$ and $R^6$ is, independently, hydrogen, or $C_{1-20}$ alkyl or $C_{1-20}$ alkoxy; $R^2$ is one of the divalent radicals

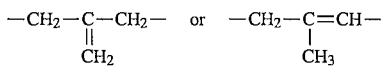

and m and n are each at least 1, and preferably each is in the range of 1 to 1000. More preferably each of m and n falls in the range of 1 to about 100, and most preferably in the range of about 1 to about 10.

The reaction between reactant (a) and reactant (b) involves, inter alia, coupling between a primary or secondary amino group or a free hydroxyl group of a molecule of reactant (a) and one of the succinic groups of a molecule of reactant (b). Depending on the temperature of the reaction and the identity of the reacting group of reactant (a), this coupling involves for the most part the formation of an imide, amide or ester linkage. When one of these coupling reactions takes place between the other succinic group of the same molecule of reactant (b) with a different molecule of reactant (a), cross linking or coupling occurs. It is also possible that in the reaction some of the molecules of reactant (b) react only on a one-to-one basis with some of the molecules of reactant (a) whereby the molecular weight of the molecules of reactant (a) is increased through this type of condensation or adduction.

Reaction may be carried out by adding an amount of reactant (b) to reactant (a) which is effective to link or chain extend at least some of the molecules of reactant (a) thereby increasing the molecular weight of the molecules of reactant (a) which participate in such reaction. Consequently, the average molecular weight of reactant (a) is increased. The amount by which the molecular weight is increased can thus be controlled by controlling the proportions of reactants (a) and (b) and by selecting reactants (a) and (b) of suitable respective number average molecular weights and chemical structure to achieve the molecular weight increase desired in any given situation. In other words, the amount of reactant (b) used in relation to reactant (a) will depend on such factors as (1) the number of reactive primary and/or secondary amino groups and/or reactive hydroxyl groups that are present in reactant (a), (2) the number average molecular weight of reactant (a), (3) the number average molecular weight or average degree of polymerization of reactant (b) (e.g., the average value of m and n in the above modified polybutene polymer), (4) the extent, if any, to which any other functional groups, if any, in the reactants participate in ancillary reactions, (5) the extent to which it is desired to cause coupling and crosslinking to occur, and (6) the properties desired in the final product.

Generally, however, it is preferred to utilize an amount of reactant (b) such that there are present from about 0.01 to about 5, preferably from about 0.05 to about 2, and more preferably from about 0.1 to about 1 equivalent of succinic groups in reactant (b) per equivalent of reactive amino groups in reactant (a).

The temperature at which the reaction is carried out generally ranges from about 50° C. to the decomposition temperature of the mixture, preferably from about 50° C. to about 250° C., and more preferably from about 100° C. to about 200° C. While superatmospheric pressures can be used, the reaction generally proceeds satisfactorily at atmospheric pressure. The reaction may be conducted using a mineral oil, e.g., 100 neutral oil as a solvent. An inert organic co-solvent, e.g., xylene or toluene, may also be used. The reaction time generally ranges from 0.5 to about 24 hours.

Further aspects of this invention reside in the formation of metal complexes and other post-treated derivatives, e.g., boronated derivatives, of the novel additives prepared in accordance with this invention. Suitable metal complexes may be formed in accordance with known techniques of employing a reactive metal ion species during or after the formation of the dispersants of this invention. Complex-forming metal reactants include the nitrates, thiocyanates, halides, carboxylates phosphates, thiophosphates, sulfates, and borates of transition metals such as iron, cobalt, nickel, copper, chromium, manganese, molybdenum, tungsten, ruthenium, palladium, platinum, cadmium, lead, silver, mercury, antimony, etc. Disclosures relating to these complexing reactions may be found in U.S. Pat. Nos. 3,306,908 and Re. 26,443.

Post-treatment compositions of this invention include those formed by reacting the dispersants of this invention with one or more post treating agents, preferably (a) one or more boronating agents, preferably a boron acid (especially boric acid or metaboric acid), a boron oxide, a boron ester, or a boron salt (especially an ammonium borate); (b) one or more phosphorylating agents, preferably an inorganic acid of phosphorus (especially phosphorous acid, $H_3PO_3$), or an anhydride thereof, or any partial or complete sulfur analog thereof; (c) one or more acylating agents, preferably maleic anhydride, fumaric acid, maleic acid, malic acid, glutaric acid, glutaric anhydride, succinic acid, $C_{1-30}$ alkylsuccinic acids or anhydrides, adipic acid, etc.; or (d) mixtures of any two of (a), (b) and (c), or of all three of (a), (b) and (c).

For further exemplification of post-treating agents and methods by which they can be employed in effecting post-treatment of ashless dispersants, reference may be had to the disclosures of the documents set forth in the following Table C, wherein all references to patent numbers are to U.S. Patents except as otherwise specified.

TABLE C

| Post-Treatments | |
|---|---|
| Post-Treating Agents | Pat. Nos. |
| Inorganic phosphorus acid or anhydride | 3,403,102; 3,502,677; 3,513,093; 4,615,826; 4,648,980 |
| Organic phosphorus compound | 3,403,102; 3,502,677; 3,511,780; 3,513,093; GB 1,153,161 GB 2,140,811 |
| Phosphorus pentasulfide | 3,184,411; 3,342,735 |
| Boron compound | 3,087,936; 3,254,025; 3,281,428; 3,282,955; 2,284,409; 2,284,410; 3,338,832; 3,344,069; 3,533,945; 3,658,836; 3,703,536; 3,718,663; 4,455,243; 4,652,387; |
| Mono- or polycarboxylic acid, anhydride, and/or acid halide | 3,185,704; 3,216,936; 3,245,908; 3,245,909; 3,245,910; 3,415,750; 3,639,242; 3,692,681; 3,708,522; 4,548,724; 4,927,562; 4,948,386; GB 1,065,595; GB 1,162,436; GB 2,140,811; EP 0,438,849 |
| Mono- or polyepoxide or thioepoxide | 3,367,943; 3,373,111; 3,579,450; 3,859,318; 5,026,495; 5,030,369 |
| Aldehyde or ketone | 3,369,021; 3,455,831; 3,455,832; 3,458,530; |
| Carbon disulfide | 3,200,107; 3,256,185 |

TABLE C-continued

| Post-Treatments | |
|---|---|
| Post-Treating Agents | Pat. Nos. |
| Glycidol | 4,617,137; 4,631,070 |
| Urea, thiourea or guanidine | 3,312,619; 3,865,813; GB 1,065,595 |
| Organic sulfonic acid | 3,189,544; GB 2,140,811 |
| Alkenyl cyanide | 3,278,550; 3,366,569 |
| Diketene | 3,546,243 |
| A diisocyanate | 3,573,205 |
| Alkane sultone | 3,749,695 |
| 1,3-Dicarbonyl compound | 4,579,675 |
| Sulfate of alkoxylated alcohol or phenol | 3,954,639 |
| Cyclic lactone | 4,617,138; 4,645,515; 4,668,246; 4,963,275; 4,971,711 |
| Cyclic carbonate or thiocarbonate, linear monocarbonate or polycarbonate, or chloroformate | 4,612,132; 4,647,390; 4,648,886; 4,670,170 |
| Nitrogen-containing carboxylic acid | 4,971,598; GB 2,140,811 |
| Hydroxy-protected chlorodicarbonyloxy compound | 4,614,522 |
| Lactam, thiolactam, thiolactone or dithiolactone | 4,614,603; 4,666,460 |
| Cyclic carbamate, cyclic thiocarbamate or cyclic dithiocarbamate | 4,663,062; 4,666,459 |
| Hydroxyaliphatic carboxylic acid | 4,482,464; 4,521,318; 4,713,189 |
| Oxidizing agent | 4,379,064 |
| Combination of phosphorus pentasulfide and a polyalkylene polyamine | 3,185,647 |
| Combination of carboxylic acid or an aldehyde or ketone and sulfur or sulfur chloride | 3,390,086; 3,470,098 |
| Combination of a hydrazine and carbon disulfide | 3,519,564 |
| Combination of an aldehyde and a phenol | 3,649,229; 5,030,249; 5,039,307 |
| Combination of an aldehyde and an O,O-diester of dithiophosphoric acid | 3,865,740 |
| Combination of a hydroxyaliphatic carboxylic acid and a boric acid | 4,554,086 |
| Combination of a hydroxyaliphatic carboxylic acid, then formaldehyde and a phenol | 4,636,322 |
| Combination of a hydroxyaliphatic carboxylic acid and then an aliphatic dicarboxylic acid | 4,663,064 |
| Combination of formaldehyde and a phenol, and then glycolic acid | 4,699,724 |
| Combination of a hydroxyaliphatic carboxylic acid or oxalic acid and then a diisocyanate | 4,713,191 |
| Combination of inorganic acid or anhydride of phosphorus or a partial or total sulfur analog thereof and a boron compound | 4,857,214 |
| Combination of an organic diacid, then an unsaturated fatty acid, and then a nitroso-aromatic amine, optionally followed by a boron compound and then a glycolating agent | 4,973,412 |
| Combination of an aldehyde and a triazole | 4,963,278 |
| Combination of an aldehyde and a triazole, then a boron compound | 4,981,492 |
| Combination of cyclic lactone and a boron compound | 4,963,275; 4,971,711 |

The compositions produced in accordance with this invention are useful as fuel and lubricating oil additives, and thus among the embodiments of this invention are fuel and lubricant compositions containing minor detergent/dispersant amounts of at least one oil-soluble dispersant formed by reacting (a) at least one dispersant having at least one primary or secondary amino group and/or at least one hydroxyl group, with (b) at least one polyolefinic compound substituted at each terminal position by a succinic group. Also provided by this invention are additive concentrates (including "additive packages" or "ad-packs") containing from 0.1 to 99.9% by weight of at least one oil-soluble dispersant formed by reacting (a) at least one dispersant having at least one primary or secondary amino group and/or at least one hydroxyl group, with (b) at least one polyolefinic compound substituted at each terminal position by a succinic group, and a minor proportion of at least one inert diluent or carrier fluid, typically a mineral oil, a poly-alpha-olefin oligomer, a polyoxyalkylene glycol, a carboxylic acid ester, etc., of suitable viscosity.

When the compositions of this invention are used in normally liquid petroleum fuels, such as middle distillates boiling in the range of from about 150° to 800° F. including gasoline, kerosene, diesel fuels, home heating fuel oil, jet fuels, cycle oils, etc., a concentration of the additive in the fuel in the range of typically from 0.001 wt. % to 2 wt. %, preferably 0.005 wt. % to 0.5 wt. %, based on the total weight of the composition, will usually be employed, although departures from these ranges can be resorted to whenever deemed desirable or necessary under particular circumstances. These additives can contribute fuel stability as well as dispersant activity and/or varnish control behavior to the fuel.

The compounds of this invention find their primary utility, however, in lubricating oil compositions, which employ a base oil in which the additives are dissolved or dispersed. Such oils may be natural or synthetic.

Thus base oils suitable for use in preparing the lubricant compositions of this invention include those conventionally employed as crankcase lubricating oils for spark-ignition engines and compression-ignition engines, such as automobile and truck engines, marine and railroad diesel engines, and the like. Advantageous results are also achieved by employing the additives of this invention in base oils conventionally employed in and/or adapted for use as power transmitting fluids such as automatic transmission fluids, tractor fluids, universal tractor fluids, hydraulic fluids, power steering fluids, and the like. Gear lubricants, industrial oils, pump oils and other lubricating oil compositions can also benefit from the incorporation therein of the additives of this invention.

Thus, the additives of this invention may be suitably incorporated into synthetic base oils or natural oils, or blends thereof, as desired for whatever end use the composition is intended.

The additives of this invention are oil-soluble, dissolvable in the oil sometimes with the aid of a suitable solvent, diluent, or compatibilizing agent, or they are capable of being dispersed in the oil to form a stable dispersion. Oil-soluble, dissolvable, or dispersible as that terminology is used herein does not necessarily indicate that the materials are soluble, dissolvable, miscible, or capable of being suspended in oil in all proportions. Rather, it means that the additives are soluble or stably dispersible in oil to an extent sufficient to exert their intended effect in the environment in which the oil is employed. Moreover, the additional incorporation of other additives may also permit incorporation of higher levels of a particular polymer adduct of this invention, if desired.

Accordingly, while any effective dispersant amount of these additives can be incorporated into the fully formulated lubricating oil composition, typically the lubricant composition will contain from about 0.01 to about 10, preferably from about 0.1 to about 8, and most preferably from about 0.25 to about 5 wt. % of the additive of this invention based on the total weight of the composition.

The additives can be incorporated into the base oil in any convenient way. Thus they can be added directly to the oil by dispersing or dissolving the additive in the oil at the desired level of concentration, typically with the aid of a suitable solvent such as toluene, xylene, cyclohexane, tetrahydrofuran, and/or light mineral oil. Such blending can occur at room temperature or at suitable elevated temperatures.

The following examples illustrate methods which may be employed in the preparation of typical dispersants pursuant to this invention. It should be understood that these examples are not intended to limit, and should not be construed as limiting, the practice of this invention.

EXAMPLE 1

A mixture of 300 grams of a S150N mineral oil solution containing about 50 wt % of polyisobutenyl succinimide formed from one equivalent of polyisobutenyl succinic anhydride (derived from polyisobutene with a number average molecular weight (GPC) of about 1845) and one equivalent of Dow S-1107 tetraethylene pentamine (a mixture of linear, branched and cyclic polyethylene polyamines having an overall composition approximating tetraethylene pentamine) and 100 grams of modified polybutene having terminal succinic groups and a number average molecular weight (GPC), and formed as described in Example 3 of U.S. Pat. No. 5,053,462 is heated, under a nitrogen blanket, at 150° C. for 5 hours. The reaction mixture is stripped for one hour at 150° C. while blowing with nitrogen. The resultant product is an oil solution of a modified dispersant of this invention.

EXAMPLE 2

The procedure of Example 1 hereinabove is repeated except that 50 grams of the modified polybutene having terminal succinic groups is used.

EXAMPLE 3

The procedure of Example 1 hereinabove is repeated except that 25 grams of the modified polybutene having terminal succinic groups is used.

EXAMPLE 4

The procedure of Example 1 hereinabove is repeated except that 10 grams of the modified polybutene having terminal succinic groups is used.

EXAMPLE 5

The respective procedures of each of Examples 1–4 hereinabove are repeated except that in each case the polyisobutene used in forming the polyisobutenyl succinic anhydride from which the initial succinimide is prepared, has a number average molecular weight (GPC) of about 1300.

EXAMPLE 6

The respective procedures of each of Examples 1–4 hereinabove are repeated except that in each case the polyisobutene used in forming the polyisobutenyl succinic anhydride from which the initial succinimide is prepared, has a number average molecular weight (GPC) of about 950.

EXAMPLE 7

The respective procedures of each of Examples 1–4 hereinabove are repeated except that in each case the polyisobutene used in forming the polyisobutenyl succinic anhydride from which the initial succinimide is prepared, has a number average molecular weight (GPC) of about 2100.

EXAMPLE 8

A mixture of 300 grams of a S15ON mineral oil solution containing about 50 wt % of polyisobutenyl succinic ester-amide formed from polyisobutenyl succinic anhydride (derived from polyisobutene with a number average molecular weight (GPC) of about 1845) and, per equivalent of such polyisobutenyl succinic anhydride, 4 equivalents of pentaerythritol and 0.25 equivalents of Dow S-1107 tetraethylene pentamine (a mixture of linear, branched and cyclic polyethylene polyamines having an overall composition approximating tetraethylenepentamine) and 100 grams of the modified polybutene referred to in Example 1 hereinabove having terminal succinic groups is heated, under a nitrogen blanket, at 150° C. for 5 hours. The reaction mixture is stripped for one hour at 150° C. while blowing with nitrogen. The resultant product is an oil solution of a modified dispersant of this invention.

EXAMPLE 9

The procedure of Example 8 hereinabove is repeated except that 50 grams of the modified polybutene having terminal succinic groups is used.

EXAMPLE 10

The procedure of Example 8 hereinabove is repeated except that 25 grams of the modified polybutene having terminal succinic groups is used.

EXAMPLE 11

The procedure of Example 8 hereinabove is repeated except that 10 grams of the modified polybutene having terminal succinic groups is used.

EXAMPLE 12

The respective procedures of each of Examples 8–11 hereinabove are repeated except that in each case the polyisobutene used in forming the polyisobutenyl succinic anhydride from which the initial succinic ester-amide is prepared, has a number average molecular weight (GPC) of about 1300.

EXAMPLE 13

The respective procedures of each of Examples 8–11 hereinabove are repeated except that in each case the polyisobutene used in forming the polyisobutenyl succinic anhydride from which the initial succinic ester-amide is prepared, has a number average molecular weight (GPC) of about 1000.

EXAMPLE 14

The respective procedures of each of Examples 8–11 hereinabove are repeated except that in each case the polyisobutene used in forming the polyisobutenyl succinic anhydride from which the initial succinic ester-amide is prepared, has a number average molecular weight (GPC) of about 2100.

EXAMPLE 15

The respective procedures of each of Examples 8–11 hereinabove are repeated except that in each case the polyisobutenyl succinic ester-amide is replaced by a chemically equivalent quantity of a commercially available partially boronated Mannich polyamine dispersant (Amoco 9250 additive).

Procedures similar to those given in Examples 1–15 above are readily adapted for use with other types of dispersants (reactant (a) components) and lower or higher molecular weight telechelics (reactant (b) components).

Further embodiments of the present invention are additive concentrates and lubricant or functional fluid compositions containing particular combinations of one or more additive components (hereinafter described) together with a modified dispersant composition of this invention (i.e., an oil-soluble dispersant formed by reacting (a) at least one dispersant having at least one primary or secondary amino group and/or at least one hydroxyl group, with (b) at least one polyolefinic compound substituted at each terminal position by a succinic group, such as illustrated in Examples 1 through 15 hereinabove). For convenience, such so-formed oil-soluble dispersants are collectively referred to below as "Product of this Invention" and these embodiments are referred to herein-below as Embodiments A, B, C, and D.

Embodiment A

One such embodiment is an oil of lubricating viscosity or an additive concentrate for use in oil of lubricating viscosity containing at least the following components:

1) one or more oil-soluble zinc hydrocarbyl dithiophosphates; and 2) at least one Product of this Invention.

The relative proportions of these components is preferably such that the weight ratio of phosphorus in 1) to nitrogen and/or oxygen in 2) (whichever ratio is larger) is in the range of from about 0.001:1 to about 100:1, and preferably in the range of about 0.01:1 to about 70:1. These combinations serve to inhibit wear; to inhibit deposit, varnish and/or sludge formation and/or deposition; and to protect the lubricant or functional fluid composition from premature oxidative degradation, especially at elevated temperatures. The quantity of these components 1) and 2) added to the base oil of lubricating viscosity (proportioned as described in this paragraph) is a minor dispersing amount, and is usually such that the amount of component 2) is in the range of about 0.01 to about 20% by weight of the total lubricating oil composition.

As is well known, zinc hydrocarbyl dithiophosphates are usually prepared by reacting phosphorus pentasulfide with one or more alcohols or phenolic compounds or diols to produce a hydrocarbyl dithiophosphoric acid which is then neutralized with one or more zinc-containing bases. When a monohydric alcohol or phenol is used in this reaction, the final product is a zinc dihydrocarbyl dithiophosphate. On the other hand, when a suitable diol (e.g., 2,4-pentanediol) is used in this reaction, the final product is a zinc salt of a cyclic hydrocarbyl dithiophosphoric acid. See, for example, U.S. Pat. No. 3,089,850. Thus typical oil-soluble zinc hydrocarbyl dithiophosphates used as component 1) may be represented by the formula

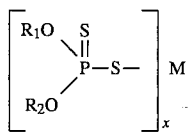

where $R_1$ and $R_2$ are, independently, hydrocarbyl groups or taken together are a single hydrocarbyl group forming a cyclic structure with the phosphorus and two oxygen atoms, preferably a hydrocarbyl-substituted trimethylene group of sufficient carbon content to render the compound oil soluble, M is zinc, and x is an integer corresponding to the valence of M. The preferred compounds are those in which $R_1$ and $R_2$ are separate hydrocarbyl groups (i.e., the zinc dihydrocarbyl dithiophosphates). Usually the hydrocarbyl groups of the zinc dihydrocarbyl dithiophosphates will contain no more than about 50 carbon atoms each although even higher molecular weight hydrocarbyl groups can be present in the compound. The hydrocarbyl groups include cyclic and acyclic groups, both saturated and unsaturated, such as alkyl, cycloalkyl, alkenyl, cycloalkenyl, aryl, cycloalkylalkyl, aralkyl, and the like. It will be understood that the hydrocarbyl groups may contain elements other than carbon and hydrogen provided such other elements do not detract from the predominantly hydrocarbonaceous character of the hydrocarbyl group. Thus the hydrocarbyl groups may contain ether oxygen atoms, thioether sulfur atoms, secondary or tertiary amino nitrogen atoms, and/or inert functional groups such as esterified carboxylic groups, keto groups, thioketo groups, and the like.

The phosphorodithioic acids from which the metal salts are formed can be prepared by the reaction of about 4 moles of one or more alcohols (cyclic or acyclic) or one or more phenols or mixture of one or more alcohols and one or more phenols (or about 2 moles of one or more diols) per mole of phosphorus pentasulfide, and the reaction may be carried out within a temperature range of from about 50° to about 200° C. The reaction generally is completed in about 1 to 10 hours. Hydrogen sulfide is liberated during the reaction.

The alcohols used in forming the phosphorodithioic acids by the above method are preferably primary alcohols, or secondary alcohols. Mixtures thereof are also suitable. The primary alcohols include propanol, butanol, isobutyl alcohol, pentanol, 2-ethyl-1-hexanol, isooctyl alcohol, nonanol, decanol, undecanol, dodecanol, tridecanol, tetradecanol, octadecanol, eicosanol, and the like. The primary alcohols may contain various substituent groups such as halogen atoms, nitro groups, etc., which do not interfere with the desired reaction. Among suitable secondary alcohols are included 2-butanol, 2-pentanol, 3-pentanol, 2-hexanol, 5-methyl-2-hexanol, and the like. In some cases, it is preferable to utilize mixtures of various alcohols, such as mixtures of 2-propanol with one or more higher molecular weight primary alcohols, especially primary alcohols having from 4 to about 13 carbon atoms in the molecule. Such mixtures preferably contain at least 10 mole percent of 2-propanol, and usually will contain from about 20 to about 90 mole percent of 2-propanol. In one preferred embodiment, the alcohol comprises about 30 to 50 mole percent of 2-propanol, about 30 to 50 mole percent isobutyl alcohol and about 10 to 30 mole percent of 2-ethyl-1-hexanol.

Other suitable mixtures of alcohols include 2-propanol/butanol; 2-propanol/2-butanol; 2-propanol/2-ethyl-1-hexanol; butanol/2-ethyl-1-hexanol; isobutyl alcohol/2-ethyl-1-hexanol; and 2-propanol/tridecanol.

Cycloaliphatic alcohols suitable for use in the production of the phosphorodithioic acids include cyclopentanol, cyclohexanol, methylcyclohexanol, cyclooctanol, borneol and the like. Preferably, such alcohols are used in combination with one or more primary alkanols such as butanol, isobutyl alcohol, or the like.

Illustrative phenols which can be employed in forming the phosphorodithioic acids include phenol, o-cresol, m-cresol, p-cresol, 4-ethylphenol, 2,4-xylenol, and the like. It is desirable to employ phenolic compounds in combination with primary alkanols such propanol, butanol, hexanol, or the like.

Other alcohols which can be employed include benzyl alcohol, cyclohexenol, and their ring-alkylated analogs.

It will be appreciated that when mixtures of two or more alcohols and/or phenols are employed in forming the phosphorodithioic acid, the resultant product will normally comprise a mixture of three or more different dihydrocarbyl phosphorodithioic acids, usually in the form of a statistical distribution in relation to the number and proportions of alcohols and/or phenols used.

Illustrative diols which can be used in forming the phosphorodithioic acids include 2,4-pentanediol, 2,4-hexanediol, 3,5-heptanediol, 7-methyl-2,4-octanediol, neopentyl glycol, 2-butyl-1,3-propanediol, 2,2-diethyl-1,3-propanediol, and the like.

The preparation of the zinc salts of the dihydrocarbyl dithiophosphoric acids or the cyclic hydrocarbyl dithiophosphoric acids is usually effected by reacting the acid product with a suitable zinc compound such as zinc oxide, zinc carbonate, zinc hydroxide, zinc alkoxide, or other appropriate zinc salt. Simply mixing and heating such reactants is normally sufficient to cause the reaction to occur and the resulting product is usually of sufficient purity for use in the practice of this embodiment of the present invention. Typically, the salts are formed in the presence of a diluent such as an alcohol, water or a light mineral oil. Neutral salts are prepared by reacting one equivalent of the zinc oxide or hydroxide with one equivalent of the acid. Basic zinc salts are prepared by adding an excess (i.e., more than one equivalent) of the zinc oxide or hydroxide with one equivalent of the dihydrocarbyl phosphorodithioic acid or cyclic hydrocarbyl phosphorodithioic acid.

In some cases, incorporation of certain ingredients such as small amounts of zinc acetate or acetic acid in conjunction with the zinc reactant will facilitate the reaction and provide an improved product. For example, use of up to about 5% of zinc acetate in combination with the required amount of zinc oxide tends to facilitate the formation of zinc dihydrocarbyl dithiophosphates.

Examples of useful zinc salts of dihydrocarbyl dithiophosphoric acids, and methods for preparing such salts are found in the prior art such as for example, U.S. Pat. Nos. 4,263,150; 4,289,635; 4,308,154; 4,322,479; 4,417,990; and 4,466,895.

Generally speaking, the preferred types of zinc salts of dihydrocarbyl dithiophosphoric acids are the oil-soluble zinc salts of dialkyl dithiophosphoric acids. Such compounds generally contain alkyl groups having at least three carbon atoms, and preferably the alkyl groups contain up to 10 carbon atoms although as noted above, even higher molecular weight alkyl groups are entirely feasible. A few illustrative zinc dialkyl dithiophosphates include zinc diisopropyl dithiophosphate, zinc dibutyl dithiophosphate, zinc diisobutyl dithiophosphate, zinc di-sec-butyl dithiophosphate, the zinc dipentyl dithiophosphates, the zinc dihexyl dithiophosphates, the zinc diheptyl dithiophosphates, the zinc dioctyl dithiophosphates, the zinc dinonyl dithiophosphates, the zinc didecyl dithiophosphates, and the higher homologs thereof. Mixtures of two or more such zinc compounds are often preferred for use, such as zinc salts of dithiophosphoric acids formed from mixtures of isopropyl alcohol and secondary butyl alcohol; isopropyl alcohol, isobutyl alcohol, and 2-ethylhexyl alcohol; isopropyl alcohol, butyl alcohol, and pentyl alcohol; isobutyl alcohol and octyl alcohol; and the like.

Embodiment B)

Another embodiment of this invention is an oil of lubricating viscosity or an additive concentrate for use in oil of lubricating viscosity containing at least the following components:

1) one or more oil-soluble or oil-dispersible alkali or alkaline-earth metal-containing detergents;

2) at least one Product of this Invention; and optionally, 3) one or more oil-soluble zinc hydrocarbyl dithiophosphates.

It will be noted that in these compositions there are at least two required components, designated 1) and 2). This embodiment also includes a three-component mixture composed of the components designated as 1), 2) and 3). In these various combinations the relative proportions of these components is preferably such that the weight ratio of metal in 1) to nitrogen or oxygen in 2) (whichever ratio is larger) is in the range of from about 0.01:1 to about 1000:1, and preferably is in the range of from about 0.1:1 to about 700:1, and such that when component 3) is employed, the weight ratio of phosphorus in component 3) to nitrogen or oxygen in component 2) (whichever ratio is larger) is in the range of from about 0,001:1 to about 100:1, and preferably in the range of about 0.01:1 to about 70:1. These combinations serve to inhibit wear; to inhibit deposit, varnish and/or sludge formation and/or deposition; and to protect the lubricant or functional fluid composition from premature oxidative degradation, especially at elevated temperatures. The quantity of these components 1) and 2), and optionally component 3) (proportioned as described in this paragraph) added to the base oil of lubricating viscosity is a minor dispersing amount, and is usually such that the amount of component 2) is in the range of about 0.01 to about 20% by weight of the total lubricating oil composition.

The metal-containing detergents which are employed in this embodiment are exemplified by oil-soluble or oil-dispersible basic salts of alkali or alkaline earth metals with one or more of the following acidic substances (or mixtures thereof): (1) sulfonic acids, (2) carboxylic acids, (3) salicylic acids, (4) alkylphenols, (5) sulfurized alkylphenols, (6) organic phosphorus acids characterized by at least one direct carbon-to-phosphorus linkage. Such organic phosphorus acids include those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The salts for use in this embodiment are preferably basic salts having a TBN of at least 50, preferably above 100, and most preferably above 200. In this connection, TBN is determined in accordance with ASTM D-2896-88.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C., and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, Cellosolve alcohol, Carbitol alcohol, ethylene glycol, stearyl alcohol, and cyclohexyl alcohol; and amines such as aniline, phenylenediamine, phenothiazine, phenyl-betanaphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60° to 200° C.

Examples of suitable metal-containing detergents include, but are not limited to, the basic or overbased salts of such substances as lithium phenates, sodium phenates, potassium phenates, calcium phenates, magnesium phenates, sulfurized lithium phenates, sulfurized sodium phenates, sulfurized potassium phenates, sulfurized calcium phenates, and sulfurized magnesium phenates wherein each aromatic group has one or more aliphatic groups to impart hydrocarbon solubility; lithium sulfonates, sodium sulfonates, potassium sulfonates, calcium sulfonates, and magnesium sulfonates wherein each sulfonic acid moiety is attached to an aromatic nucleus which in turn usually contains one or more aliphatic substituents to impart hydrocarbon solubility; lithium salicylates, sodium salicylates, potassium salicylates, calcium salicylates, and magnesium salicylates wherein the aromatic moiety is usually substituted by one or more aliphatic substituents to impart hydrocarbon solubility; the lithium, sodium, potassium, calcium and magnesium salts of hydrolyzed phosphosulfurized olefins having 10 to 2,000 carbon atoms or of hydrolyzed phosphosulfurized alcohols and/or aliphatic-substituted phenolic compounds having 10 to 2,000 carbon atoms; lithium, sodium, potassium, calcium and magnesium salts of aliphatic carboxylic acids and aliphatic-substituted cycloaliphatic carboxylic acids; and many other similar alkali and alkaline earth metal salts of oil-soluble organic acids. Mixtures of basic or overbased salts of two or more different alkali and/or alkaline earth metals can be used. Likewise, basic or overbased salts of mixtures of two or more different acids or two or more different types of acids (e.g., one or more calcium phenates with one or more calcium sulfonates) can also be used. While rubidium, cesium and strontium salts are feasible, their expense renders them impractical for most uses. Likewise, while barium salts are effective, the status of barium as a heavy metal under a toxicological cloud renders barium salts less preferred for present-day usage.

As is well known, overbased metal detergents are generally regarded as containing overbasing quantities of inorganic bases, probably in the form of micro dispersions or colloidal suspensions. Thus the terms "oil-soluble" and "oil-dispersible" are applied to these metal-containing detergents so as to include metal detergents wherein inorganic bases are present that are not necessarily completely or truly oil-soluble in the strict sense of the term, inasmuch as such detergents when mixed into base oils behave in much the same way as if they were fully and totally dissolved in the oil.

Collectively, the various basic or overbased detergents referred to hereinabove, have sometimes been called, quite simply, basic alkali metal or alkaline earth metal-containing organic acid salts.

Methods for the production of oil-soluble basic and overbased alkali and alkaline earth metal-containing detergents are well known to those skilled in the art and are extensively reported in the patent literature. See for example, the disclosures of U.S. Pat. Nos. 2,451,345; 2,451,346; 2,485,861; 2,501,731; 2,501,732; 2,585,520; 2,671,758; 2,616,904; 2,616,905; 2,616,906; 2,616,911; 2,616,924; 2,616,925; 2,617,049; 2,695,910; 3,178,368; 3,367,867; 3,496,105; 3,629,109; 3,865,737; 3,907,691; 4,100,085; 4,129,589; 4,137,184; 4,148,740; 4,212,752; 4,617,135; 4,647,387; 4,880,550; GB Published Patent Application 2,082,619 A, and European Patent Publication Nos. 121,024 B1 and 259,974 A2.

Embodiment C

Still another embodiment of this invention is an oil of lubricating viscosity or an additive concentrate for use in oil of lubricating viscosity containing at least the following components:

1) one or more oil-soluble or oil-dispersible sulfur-containing antiwear and/or extreme pressure agents; and 2) at least one Product of this Invention; and 3) optionally, one or more oil-soluble zinc hydrocarbyl dithiophosphates; and/or 4) optionally, one or more oil-soluble or oil-dispersible alkali or alkaline earth metal detergents.

It will be noted that in these compositions there are at least two required components, designated 1) and 2). This embodiment also includes two three-component mixtures, the first composed of the components designated as 1), 2) and 3) and the second composed of the components designated as 1), 2) and 4). And additionally this embodiment comprises the four-component combinations composed of the components designated as 1), 2), 3) and 4). In these various combinations the relative proportions of these components is preferably such that the weight ratio of sulfur in 1) to nitrogen or oxygen in 2) (whichever ratio is larger) is in the range of from about 0.001:1 to about 100:1, and preferably in the range of about 0.01 to about 70:1; such that when component 3) is employed, the weight ratio of phosphorus as component 3) to nitrogen or oxygen as component 2) (whichever ratio is larger) is in the range of from about 0.001:1 to about 100:1, and preferably in the range of about 0.01:1 to about 70:1; and such that when component 4) is employed, the weight ratio of metal as component 4) to nitrogen or oxygen as component 2) (whichever ratio is larger) is in the range of from about 0.001:1 to about 1000:1, and preferably in the range of from about 0.1:1 to about 700:1. These combinations serve to inhibit wear; to inhibit deposit, varnish and/or sludge formation and/or deposition; and to protect the lubricant or functional fluid composition from premature oxidative degradation, especially at elevated temperatures. The quantity of these components 1) and 2), and optionally 3) and/or 4) (proportioned as described in this paragraph) added to the base oil of lubricating viscosity is a minor dispersing amount, and is usually such that the amount of component 2) is in the range of about 0.01 to about 20% by weight of the total lubricating oil composition.

Various types of sulfur-containing antiwear and/or extreme pressure agents can be used in the practice of Embodiment C. Examples are included within the categories of dihydrocarbyl polysulfides; sulfurized olefins; sulfurized fatty acid esters of both natural and synthetic origins; trithiones; sulfurized thienyl derivatives; sulfurized terpenes; sulfurized oligomers of $C_2$–$C_8$ monoolefins; and sulfurized Diels-Alder adducts such as those disclosed in U.S. Pat. No. Re 27,331. Specific examples include sulfurized polyisobutene of $\overline{M}n$ 1,100, sulfurized isobutylene, sulfurized diisobutylene, sulfurized triisobutylene, dicyclohexyl polysulfide, diphenyl polysulfide, dibenzyl polysulfide, dinonyl polysulfide, and mixtures of di-tert-butyl polysulfide such as mixtures of di-tert-butyl trisulfide, di-tert-butyl tetrasulfide and di-tert-butyl pentasulfide, among others. Combinations of such categories of sulfur-containing antiwear and/or extreme pressure agents can also be used, such as a combination of sulfurized isobutylene and di-tert-butyl trisulfide, a combination of sulfurized isobutylene and dinonyl trisulfide, a combination of sulfurized tall oil and dibenzyl polysulfide, and the like.

One type of sulfur-containing antiwear and/or extreme pressure agents is comprised of the oil-soluble active sulfur-containing antiwear and/or extreme pressure agents. Generally speaking, these are substances which possess a linkage of two or more sulfur atoms (e.g., —S—S—, —S—S—S—, —S—S—S—S—, S—S—S—S—S—, etc.).

To determine whether a sulfur-containing material is an active sulfur-containing material, use is made of a copper coupon corrosion test conducted as follows: A copper coupon approximately 70×15 mm and about 1.25 mm in thickness is cleaned by use of steel wool (0000 grade), washed with heptane, and then with acetone, dried, and weighed to the nearest 0.1 mg. The cleaned coupon is placed in a test tube and covered completely with the composition to be tested, and the system is heated to 125° C. by means of an oil bath. After holding the system at 125° C. for three hours, the copper coupon is removed from the test tube, rinsed with heptane, and then with acetone. The dried coupon is then rubbed with a paper towel moistened with acetone to remove any surface flakes formed by copper corrosion. The coupon is then air-dried and weighed to the nearest 0.1 mg. The difference in weight between the initial copper coupon and the coupon after the test represents the extent to which the copper was corroded under the test conditions. Therefore the larger the weight difference, the greater the copper corrosion, and thus the more active the sulfur compound. If the coupon weight loss is 30 milligrams or more, the sulfur-containing agent is considered "active".

Another type of sulfur-containing antiwear and/or extreme pressure agents suitable for use in the practice of this invention is comprised of "non-active" sulfur-containing additives. These are materials which when subjected to the above copper coupon corrosion test give a weight loss of less than 30 milligrams. Examples of materials falling in this category include Anglamol 33 additive (a sulfurized isobutylene product of The Lubrizol Corporation), distilled di-tert-butyl trisUlfide, and the like.

Because of the toxicity of hydrogen sulfide, it is preferable, though not essential, to utilize in the practice of this invention oil-soluble sulfur-containing antiWear and/or extreme pressure agents, and more preferably oil-soluble active sulfur-containing antiwear and/or extreme pressure agents, that yield less than 25 ppm, and more preferably less than 10 ppm, of vapor space $H_2S$ when heated in the concentrated state for one week at 65° C. Most preferred are materials of this type which yield no detectable vapor space $H_2S$ when tested under these conditions.

The most preferred oil-soluble metal-free sulfur-containing antiwear and/or extreme pressure agents from the cost-effectiveness standpoint are the sulfurized olefins containing at least 30% by weight of sulfur, the dihydrocarbyl polysulfides containing at least 25% by weight of sulfur, and mixtures of such sulfurized olefins and polysulfides. Of these materials, sulfurized isobutylene having a sulfur content of at least 40% by weight and a chlorine content of less than 0.2% by weight is the most especially preferred material. Methods of preparing sulfurized olefins are described in U.S. Pat. Nos. 2,995,569; 3,673,090; 3,703,504; 3,703,505; 3,796,661; and 3,873,454. Also useful are the sulfurized olefin derivatives described in U.S. Pat. No. 4,654,156.

When including component 3) in the practice of Embodiment C, use can be made of any of the zinc hydrocarbyl dithiophosphates referred to hereinabove with reference to Embodiment A.

Embodiment D

A still further embodiment of this invention is an oil of lubricating viscosity or an additive concentrate for use in oil of lubricating viscosity containing at least the following components:

1) at least one oil-soluble metal-free phosphorus-containing (preferably phosphorus- and nitrogen-containing) antiwear and/or extreme pressure agent, most preferably an amine salt of at least one dihydrocarbyl ester of a thiophosphoric acid; and 2) at least one Product of this Invention; and 3) optionally, one or more oil-soluble or oil-dispersible sulfur-containing antiwear and/or extreme pressure agents.

It will be noted that in these compositions there are at least two required components, designated 1) and 2). This embodiment also includes three-component mixtures composed of the components designated as 1), 2) and 3). In these various combinations the relative proportions of these components is preferably such that the weight ratio of phosphorus in 1) to nitrogen or oxygen in 2) (whichever ratio is larger) is in the range of from about 0.001:1 to about 100:1, and preferably in the range of about 0.01:1 to about 70:1; and such that when component 3) is employed, the weight ratio of sulfur in component 3) to nitrogen or oxygen in component 2) (whichever ratio is larger) is in the range of from about 0.001:1 to about 100:1, and preferably in the range of about 0.01 to about 70:1. These combinations serve to inhibit wear and to inhibit deposit, varnish and/or sludge formation and/or deposition. The quantity of these components 1) and 2), and optionally 3) (proportioned as described in this paragraph) added to the base oil of lubricating viscosity is a minor dispersing amount, and is usually such that the amount of component 2) is in the range of about 0.01 to about 20% by weight of the total lubricating oil composition.

For purposes of this invention a component which contains both phosphorus and sulfur in its chemical structure is deemed a phosphorus-containing antiwear and/or extreme pressure agent rather than a sulfur-containing antiwear and/or extreme pressure agent.

Although use can be made of a wide variety of oil-soluble substances such as the oil-soluble organic phosphates, organic phosphites, organic phosphonates, organic phosphonites, etc., and their sulfur analogs, the preferred phosphorus-containing antiwear and/or extreme pressure agents for use in tis embodiment those which contain both phosphorus and nitrogen.

One such type of phosphorus- and nitrogen-containing antiwear and/or extreme pressure additives Which can be employed in the practice of this embodiment of the invention are the phosphorus- and nitrogen-containing compositions of the type described in G.B. 1,009,913; G.B. 1,009, 914; U.S. Pat. No. 3,197,405 and/or U.S. Pat. No. 3,197,496. In general, these compositions are formed by forming an acidic intermediate by the reaction of a hydroxy-substituted triester of a phosphorothioic acid with an inorganic phosphorus acid, phosphorus oxide or phosphorus halide, and neutralizing a substantial portion of said acidic intermediate with a amine or hydroxy-substituted amine.

Another type of phosphorus- an$_d$ nitrogen-containing antiwear and/or extreme pressure additive which can be used in the compositions of this invention is the amine salts of hydroxy-substituted phosphetanes or the amine salts of hydroxy-substituted thiophosphetanes. Typically, such salts are derived from compounds of the formula

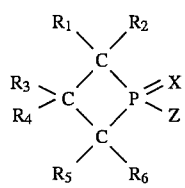

wherein each of $R_1$, $R_2$, $R_3$, $R_4$, $R_5$ and $R_6$ is a hydrogen atom or a carbon-bonded organic group such as a hydrocarbyl group or a substituted hydrocarbyl group wherein the substituent(s) do(es) not materially detract from the predominantly hydrocarbonaceous character of the hydrocarbyl group; X is a sulfur or an oxygen atom and z is a hydroxyl group or an organic group having one or more acidic hydroxyl groups. Examples of this general type of antiwear and/or extreme pressure agent include the amine salts hydroxyphosphetanes and the amine salts of hydroxy-thiophosphetanes typified by Irgalube 295 additive (Ciba-Geigy Corporation).

Another useful category of phosphorus- and nitrogen-containing antiwear and/or extreme pressure agents is comprised of the amine salts of partial esters of phosphoric and thiophosphoric acids. Such compounds may be collectively represented by the formulas XI, XII, and XIII as follows:

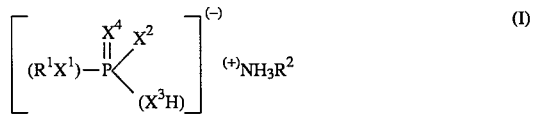

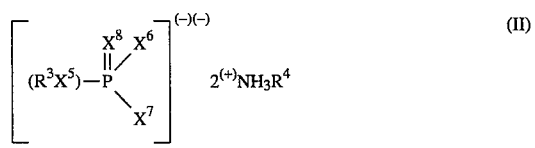

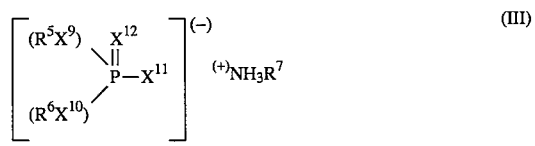

or mixtures thereof. In Formulas XI, XII and XIII, each of $R^1$, $R^2$, $R^3$, $R^4$, $R^5$, $R^6$, and $R^7$ is independently, a hydrocarbyl group and each of $X^1$, $X^2$, $X^3$, $X^4$, $X^5$, $X^6$, $X^7$, $X^8$, $X^9$, $X^{10}$, $X^{11}$, and $X^{12}$ is, independently, an oxygen atom or a sulfur atom.

In one preferred sub-category the amine salts are formed with one or more partially esterified; monothiophosphoric acids. These are compounds of Formulas XI, XII, and XIII above wherein only one of $X^1$, $X^2$, $X^3$, and $X^4$, only one of $X^5$, $X^6$, $X^7$, and $X^8$, and only one of $X^9$, $X^{10}$, $X^{11}$, and $X^{12}$ is a sulfur atom.

In another preferred sub-category the amine salts are formed with one or more partially esterified phosphoric acids. These are compounds of Formulas XI, XII, and XIII above wherein all of $X^1$, $X^2$, $X^3$, $X^4$, $X^5$, $X^6$, $X^7$, $X^8$, $X^9$, $X^{10}$, $X^{11}$, and $X^{12}$ are oxygen atoms.

Another preferred sub-category of amine salts are those formed with one or more partially esterified dithiophosphoric acids. These are compounds of Formulas XI, XII, and XIII above wherein two of $X^1$, $X^2$, $X^3$, and $X^4$, two of $X^5$, $X^6$, $X^7$, and $X^8$, and two of $X^9$, $X^{10}$, $X^{11}$, and $X^{12}$ are sulfur atoms.

Also useful are amine salts of Formulas XI, XII, and XII above wherein three or four of $X^1$, $X^2$, $X^3$, and $X^4$, three or four of $X^5$, $X^6$, $X^7$, and $X^8$, and three or four of $X^9$, $X^{10}$, $X^{11}$, and $X^{12}$ are sulfur atoms.

While all of the above oil-soluble amine salts are suitable for use as component 3), it is most preferred to use at least one oil-soluble amine salt of a dihydrocarbyl monothiophosphoric acid (one sulfur atom per molecule), either alone or in combination with at least one oil-soluble amine salt of a dihydrocarbyl phosphoric acid (no sulfur atom in the molecule).

Suitable salts or amine adducts of the partially esterified monothiophosphoric acids include such compounds as:

Octylamine salt of O-monobutylthiophosphoric acid
Octylamine salt of S-monobutylthiophosphoric acid
Octylamine salt of O-monobutylthionophosphoric acid
Octylamine salt of O,O-dibutylthiophosphoric acid
Octylamine salt of O,S-dibutylthiophosphoric acid
Octylamine salt of O,O-dibutylthionophosphoric acid
Octylamine salt of O-monoisobutylthiophosphoric acid
Octylamine salt of S-monoisobutylthiophosphoric acid
Octylamine salt of O-monoisobutylthionophosphoric acid
Octylamine salt of O,O-diisobutylthiophosphoric acid
Octylamine salt of O,S-diisobutylthiophosphoric acid
Octylamine salt of O,O-diisobutylthionophosphoric acid
Octylamine salt of O-monoamylthiophosphoric acid
Octylamine salt of S-monoamylthiophosphoric acid
Octylamine salt of O-monoamylthionophosphoric acid
Octylamine salt of O,O-diamylthiophosphoric acid
Octylamine salt of O,S-diamylthiophosphoric acid
Octylamine salt of O,O-diamylthionophosphoric acid
Octylamine salt of O-monohexylthiophosphoric acid
Octylamine salt of S-monohexylthiophosphoric acid
Octylamine salt of O-monohexylthionophosphoric acid
Octylamine salt of O,O-dihexylthiophosphoric acid
Octylamine salt of O,S-dihexylthiophosphoric acid
Octylamine salt of O,O-dihexylthionophosphoric acid
Octylamine salt of O-monoheptylthiophosphoric acid
Octylamine salt of S-monoheptylthiophosphoric acid
Octylamine salt of O-monoheptylthionophosphoric acid
Octylamine salt of O,O-diheptylthiophosphoric acid
Octylamine salt of O,S-diheptylthiophosphoric acid
Octylamine salt of O,O-diheptylthionophosphoric acid
Octylamine salt of O-mono-2-ethylhexylthiophosphoric acid
Octylamine salt of S-mono-2-ethylhexylthiophosphoric acid
Octylamine salt of O-mono-2-ethylhexylthionophosphoric acid
Octylamine salt of O,O-di-2-ethylhexylthiophosphoric acid
Octylamine salt of O,S-di-2-ethylhexylthiophosphoric acid
Octylamine salt of O,O-di-2-ethylhexylthionophosphoric acid
Octylamine salt of O-monooctylthiophosphoric acid
Octylamine salt of S-monooctylthiophosphoric acid
Octylamine salt of O-monooctylthionophosphoric acid
Octylamine salt of O,O-dioctylthiophosphoric acid
Octylamine salt of O,S-dioctylthiophosphoric acid
Octylamine salt of O,O-dioctylthionophosphoric acid
Octylamine salt of O-mononylthiophosphoric acid
Octylamine salt of S-mononylthiophosphoric acid
Octylamine salt of O-mononylthionophosphoric acid
Octylamine salt of O,O-dinonylthiophosphoric acid
Octylamine salt of O,S-dinonylthiophosphoric acid
Octylamine salt of O,O-dinonylthionophosphoric acid
Octylamine salt of O-monodecylthiophosphoric acid
Octylamine salt of S-monodecylthiophosphoric acid
Octylamine salt of O-monodecylthionophosphoric acid
Octylamine salt of O,O-didecylthiophosphoric acid
Octylamine salt of O,S-didecylthiophosphoric acid
Octylamine salt of O,O-didecylthionophosphoric acid
Octylamine salt of O-monododecylthiophosphoric acid
Octylamine salt of S-monododecylthiophosphoric acid
Octylamine salt of O-monododecylthionophosphoric acid
Octylamine salt of O,O-didodecylthiophosphoric acid
Octylamine salt of O,S-didodecylthiophosphoric acid
Octylamine salt of O,O-didodecylthionophosphoric acid
Octylamine salt of O-monotridecylthiophosphoric acid
Octylamine salt of S-monotridecylthiophosphoric acid
Octylamine salt of O-monotridecylthionophosphoric acid
Octylamine salt of O,O-ditridecylthiophosphoric acid
Octylamine salt of O,S-ditridecylthiophosphoric acid
Octylamine salt of O,O-ditridecylthionophosphoric acid
Octylamine salt of O-monotetradecylthiophosphoric acid
Octylamine salt of S-monotetradecylthiophosphoric acid
Octylamine salt of O-monotetradecylthionophosphoric acid
Octylamine salt of O,O-ditetradecylthiophosphoric acid
Octylamine salt of O,S-ditetradecylthiophosphoric acid
Octylamine salt of O,O-ditetradecylthionophosphoric acid
Octylamine salt of O-monohexadecylthiophosphoric acid
Octylamine salt of S-monohexadecylthiophosphoric acid
Octylamine salt of O-monohexadecylthionophosphoric acid
Octylamine salt of O,O-dihexadecylthiophosphoric acid
Octylamine salt of O,S-dihexadecylthiophosphoric acid
Octylamine salt of O,O-dihexadecylthionophosphoric acid
Octylamine salt of O-monooctadecylthiophosphoric acid
Octylamine salt of S-monooctadecylthiophosphoric acid
Octylamine salt of O-monooctadecylthionophosphoric acid
Octylamine salt of O,O-dioctadecylthiophosphoric acid
Octylamine salt of O,S-dioctadecylthiophosphoric acid
Octylamine salt of O,O-dioctadecylthionophosphoric acid
Octylamine salt of O-monooleylthiophosphoric acid
Octylamine salt of S-monooleylthiophosphoric acid
Octylamine salt of O-monooleylthionophosphoric acid
Octylamine salt of O,O-dioleylthiophosphoric acid
Octylamine salt of O,S-dioleylthiophosphoric acid
Octylamine salt of O,O-dioleylthionophosphoric acid
Octylamine salt of O-monobenzylthiophosphoric acid
Octylamine salt of S-monobenzylthiophosphoric acid
Octylamine salt of O-monobenzylthionophosphoric acid
Octylamine salt of O,O-dibenzylthiophosphoric acid
Octylamine salt of O,S-dibenzylthiophosphoric acid
Octylamine salt of O,O-dibenzylthionophosphoric acid
Octylamine salt of O-monocyclohexylthiophosphoric acid
Octylamine salt of S-monocyclohexylthiophosphoric acid
Octylamine salt of O-monocyclohexylthionophosphoric acid
Octylamine salt of O,O-dicyclohexylthiophosphoric acid
Octylamine salt of O,S-dicyclohexylthiophosphoric acid
Octylamine salt of O,O-dicyclohexylthionophosphoric acid
Octylamine salt of O-mono-p-tolylthiophosphoric acid
Octylamine salt of S-mono-p-tolylthiophosphoric acid
Octylamine salt of O-mono-p-tolylthionophosphoric acid
Octylamine salt of O,O-di-p-tolylthiophosphoric acid
Octylamine salt of O,S-di-p-tolylthiophosphoric acid
Octylamine salt of O,O-di-p-tolylthionophosphoric acid
Octylamine salt of O-monoxylylthiophosphoric acid
Octylamine salt of S-monoxylylthiophosphoric acid
Octylamine salt of O-monoxylylthionophosphoric acid Octylamine salt of O,O-dixylylthiophosphoric acid
Octylamine salt of O,S-dixylylthiophosphoric acid
Octylamine salt of O,O-dixylylthionophosphoric acid
Octylamine salt of O-isopropyl-O-octadecylthiophosphoric acid
Octylamine salt of O-nonyl-S-butylthiophosphoric acid
Octylamine salt of O-undecyl-O-methylthionophosphoric acid
Octylamine salt of O-cyclohexyl-S-decylthiophosphoric acid
Octylamine salt of O-phenyl-S-tetradecylthiophosphoric acid
Octylamine salt of O-pentadecyl-O-cyclohexenylthionophosphoric acid
Octylamine salt of O-ethyl-O-(p-tert-amylphenyl)thionophosphoric acid
Octylamine salt of O-benzyl-S-isononylthiophosphoric acid
Octylamine salt of O-cyclopentyl-O-heptadecylthionophosphoric acid
Octylamine salt of O-oleyl-S-butylthiophosphoric acid
Octylamine salt of O-2-ethylhexyl-O-isooctylthionophosphoric acid
Octylamine salt of O-allyl-S-tridecylthiophosphoric acid.

It will be noted that in the above listing of illustrative amine salts, the partially esterified monothiophosphoric acids have been named, for convenience, by use of the "thio-thiono" system of nomenclature in which thiono refers to a sulfur atom bonded to the phosphorus atom by a double bond whereas thio refers to a sulfur atom that is bonded to the phosphorus atom by a single bond. Such compounds can also be named by use of a "thioic" system of nomenclature. For example, O,O-dihydrocarbylthionophosphoric acid is also known as O,O-dihydrocarbylphosphorothioic acid, $(RO)_2P(S)(OH)$. However, except when referring to specific compounds (as in the above "thio-thiono" listing) the term "monothiophosphoric acid" is used generically herein to refer to phosphoric acid having only one sulfur atom, and that sulfur atom can be bonded to the phosphorus atom either by a single bond or by a double bond. Likewise except when referring to specific compounds, the term "dithiophosphoric acid" refers to phosphoric acid having two sulfur atoms both of which can be bonded to the phosphorus atom by single bonds, or one of which is bonded to the phosphorus atom by a double bond and the other of which is bonded to the phosphorus atom by single bond. The same applies to the term "trithiophosphoric acid", wherein two of the three sulfur atoms can be bonded to the phosphorus atom by single bonds and the third by either a single or double bond.

Illustrative examples of amine salts of partial esters of phosphoric acid include the following:
Octylamine salt of monobutylphosphoric acid
Octylamine salt of dibutylphosphoric acid
Octylamine salt of monoisobutylphosphoric acid
Octylamine salt of diisobutylphosphoric acid
Octylamine salt of monoamylphosphoric acid
Octylamine salt of diamylphosphoric acid
Octylamine salt of monohexylphosphoric acid
Octylamine salt of dihexylphosphoric acid
Octylamine salt of monoheptylphosphoric acid
Octylamine salt of diheptylphosphoric acid
Octylamine salt of mono-2-ethylhexylphosphoric acid
Octylamine salt of di-2-ethylhexylphosphoric acid
Octylamine salt of monooctylphosphoric acid
Octylamine salt of dioctylphosphoric acid
Octylamine salt of mononoylphosphoric acid
Octylamine salt of dinonylphosphoric acid
Octylamine salt of monodecylphosphoric acid
Octylamine salt of didecylphosphoric acid
Octylamine salt of monododecylphosphoric acid
Octylamine salt of didodecylphosphoric acid
Octylamine salt of monotridecylphosphoric acid
Octylamine salt of ditridecylphosphoric acid
Octylamine salt of monotetradecylphosphoric acid
Octylamine salt of ditetradecylphosphoric acid
Octylamine salt of monohexadecylphosphoric acid
Octylamine salt of dihexadecylphosphoric acid
Octylamine salt of monooctadecylphosphoric acid
Octylamine salt of dioctadecylphosphoric acid
Octylamine salt of monooleylphosphoric acid
Octylamine salt of dioleylphosphoric acid
Octylamine salt of monobenzylphosphoric acid
Octylamine salt of dibenzylphosphoric acid
Octylamine salt of monocyclohexylphosphoric acid
Octylamine salt of dicyclohexylphosphoric acid
Octylamine salt of mono-p-tolylphosphoric acid
Octylamine salt of di-p-tolylphosphoric acid
Octylamine salt of monoxylylphosphoric acid
Octylamine salt of dixylylphosphoric acid
Octylamine salt of monoisopropyl-monooctadecylphosphoric acid
Octylamine salt of mononoyl-monobutylphosphoric acid
Octylamine salt of monoundecyl-monomethylphosphoric acid
Octylamine salt of monocyclohexyl-monodecylphosphoric acid
Octylamine salt of monophenyl-monotetradecylphosphoric acid
Octylamine salt of monopentadecyl-monocyclohexenylphosphoric acid
Octylamine salt of monoethyl-mono(p-tert-amylphenyl)phosphoric acid
Octylamine salt of monobenzyl-monoisononylphosphoric acid
Octylamine salt of monocyclopentyl-monoheptadecylphosphoric acid
Octylamine salt of monooleyl-monobutylphosphoric acid
Octylamine salt of mono-(2-ethylhexyl)-monoisooctylphosphoric acid
Octylamine salt of monoallyl-monotridecylphosphoric acid.

Examples of corresponding amine salts of partially esterified dithiophosphoric acid, of partially esterified trithiophosphoric acid, and of partially esterified tetrathiophosphoric acid will be readily apparent from the above listings.

Octylamine salts or adducts have been set forth in the above two listings merely for purposes of illustration. In lieu of octyl amine salts, or in addition thereto, use can be made of nonylamine, decylamine, undecylamine, dodecylamine, tridecylamine, tetradecylamine, pentadecylamine, hexadecylamine, heptadecylamine, octadecylamine, cyclohexylamine, phenylamine, mesitylamine, oleylamine, cocoamine, soyamine, $C_8$ tertiary alkyl primary amine, $C_{12-14}$ tertiary alkyl primary amine, $C_{22-24}$ tertiary alkyl primary amine, phenethylamine, etc., salts or adducts of partially esterified phosphoric, monothiophosphoric, dithiophosphoric, trithiophosphoric, and/or tetrathiophosphoric acids, including mixtures of any such compounds. Generally speaking, the preferred amine salts are salts of aliphatic amines, especially the saturated or olefinically unsaturated aliphatic primary amines, such as n-octylamine, 2-ethylhexylamine, tert-octylamine, n-decylamine, the $C_{10}$, $C_{12}$, $C_{14}$ and $C_{16}$ tertiary alkyl primary amines (either singly or in any combinations thereof, such as a mixture of the $C_{12}$ and $C_{14}$ tertiary alkyl primary amines), n-undecylamine, a mixture of $C_{14}$ to $C_{18}$ tertiary alkyl primary amines, lauryl amine, hexadecylamine, heptadecylamine, octadecylamine, the $C_{22}$ and $C_{24}$ tertiary alkyl primary amines (either singly or in combination), decenylamine, dodecenylamine, palmitoleylamine, oleylamine, linoleylamine, eicosenylamine, etc. Secondary hydrocarbyl amines and tertiary hydrocarbyl amines can also be used either alone or in combination with each other or in combination with primary amines. Thus any combination of primary, secondary and/or tertiary amines, whether monoamine or polyamine, can be used in forming the salts or adducts.

Similarly, the amines used can be in the form of polyalkylene polyamines; functionally-substitutedpolyamines such as a succinimide or succinamide of a polyalkylene polyamines such as a polyisobutenyl succinimide of diethylene triamine, a polyisobutenyl succinimide of triethylene tetramine, a polyisobutenyl succinimide of tetraethylene pentamine, a polyisobutenyl succinimide of pentaethylene hexamine (including succinimides made from commercially available polyethylene polyamine mixtures which contain linear, branched and cyclic species); and Mannich bases derived from polyalkylene polyamines of the types just described. Moreover, the polyalkylene polyamines whether in the free state or in the form of a succinimide, succinamide, or Mannich base, can be partially boronated, partially phosphorylated, or partially acylated with a reagent such as maleic anhydride, malic acid, itaconic acid, itaconic anhydride, thiomalic acid, fumaric acid, and the like, provided that such boronated or phosphorylated or acylated amine or amine moiety contains at least sufficient residual basicity to enable it to form a salt with the partially esterified phosphoric or thiophosphoric acid. Alkylene polyamines in the form of succinimides, succinamides or Mannich bases which have been boronated and phosphorylated are described for example in U.S. Pat. No. 4,857,214.

Use of primary amines is preferred. Especially preferred amines are alkyl monoamines and alkenyl monoamines having from about 8 to about 24 carbon atoms in the molecule.

Amines having less than 8 carbon atoms can be used, including methyl amine, etc., provided the resultant amine salt is oil-soluble. Likewise, amines having more than 24 carbon atoms can be used, again with the proviso that the resultant amine salt is oil soluble.

Methods for the preparation of such amine salts are well known and reported in the literature. See for example, U.S. Pat. Nos. 2,063,629; 2,224,695; 2,447,288; 2,616,905; 3,984,448; 4,431,552; Pesin et al, *Zhurnal Obshchei Khimii*, Vol. 31, No. 8, pp. 2508–2515 (1961); and International Application Publication No. WO 87/07638.

It should be noted that amine salts of partially esterified monothiophosphoric acids are usually made by reacting a mono- and/or dihydrocarbyl phosphite with sulfur or an active sulfur-containing compound such as are referred to above under the caption "Sulfur-Containing Antiwear and/or Extreme Pressure Agents" and one or more primary or secondary amines. Such reactions tend to be highly exothermic reactions which can become uncontrollable, if not conducted properly. One preferred method of forming these amine salts involves a process which comprises (i) introducing, at a rate such that the temperature does not exceed about 60° C., one or more dihydrocarbyl hydrogen phosphites, such as a dialkyl hydrogen phosphite, into an excess quantity of one or more active sulfur-containing materials, such as sulfurized branched-chain olefin (e.g., isobutylene, diisobutylene, triisobutylene, etc.), while agitating the mixture so formed, (ii) introducing into this mixture, at a rate such that the temperature does not exceed about 60° C., one or more aliphatic primary or secondary amines, preferably one or more aliphatic primary monoamines having in the range of about 8 to about 24 carbon atoms per molecule while agitating the mixture so formed, and (iii) maintaining the temperature of the resultant agitated reaction mixture at between about 55° and about 60° C. until reaction is substantially complete. Another suitable way of producing these amine salts is to concurrently introduce all three of the reactants into the reaction zone at suitable rates and under temperature control such that the temperature does not exceed about 60° C. Another preferred way of forming amine salts of partially esterified monothiophosphoric acids is to pre-react elemental sulfur with the amine for a short period of time and then add thereto the appropriate dihydrocarbyl hydrogen phosphite at a rate such that the temperature does not become excessive and the reaction uncontrollable.

As indicated above, the amine salts of dihydrocarbyl esters of thiophosphoric acids are comprised of the oil-soluble amine salts (preferably the aliphatic monoamine salts) of one or more dihydrocarbyl esters of a thiophosphoric acid, which esters can be derived from a tetrathiophosphoric acid, a trithiophosphoric acid, a dithiophosphoric acid, or a monothiophosphoric acid, or a mixture of any two or more of the foregoing. The amine salts of dihydrocarbyl esters of a dithiophosphoric acid are preferred, and the amine salts of dihydrocarbyl esters of a monothiophosphoric acid are particularly preferred.

As pointed out above, oil-soluble phosphorus- and nitrogen-containing compounds are the preferred antiwear and/or extreme pressure agents for use in the compositions of this invention. However, metal-free phosphorus-containing compounds which do not contain nitrogen can be used either in lieu of or in addition to the phosphorus- and nitrogen-containing antiwear and/or extreme pressure agents described above. Such nitrogen-free compounds are for the most part partially or fully esterified acids of phosphorus, and include for example oil-soluble phosphates, phosphites, phosphonates, phosphonites, and their various sulfur analogs. Examples include monohydrocarbyl phosphites; monohydrocarbyl phosphates; monohydrocarbyl mono-, di-, and trithiophosphites; monohydrocarbyl mono-, di-, tri-, and tetrathiophosphates; dihydrocarbyl phosphites; dihydrocarbyl phosphates; dihydrocarbyl mono-, di-, and trithiophosphites; dihydrocarbyl mono-,di-, tri-, and tetrathiophosphates; trihydrocarbyl phosphites; trihydrocarbylphosphates; trihydrocarbyl mono-, di-, and trithiophosphites; trihydrocarbyl mono-, di-, tri-, and tetrathiophosphates; the various hydrocarbyl phosphonates and thiophosphonates; the various hydrocarbyl phosphonites and thiophosphonites, and analogous oil-soluble derivatives of polyphosphoric and polythiophosphoric acids; and many others. A few specific examples of such compounds are tributyl phosphate, tri-(2-ethylhexyl) phosphate, trioleyl phosphate, tris(2-chloroethyl) phosphate, tricyclohexyl phosphate, triphenyl phosphate, tricresyl phosphate, cresyl diphenyl phosphate, triethyl phosphite, tributyl phosphite, tris(-butoxyethyl) phosphite, trioctyl phosphite, tris(tridecyl) phosphite, trilauryl phosphite, triphenyl phosphite, tricresyl phosphite, the mono- or diamyl hydrogen phosphates or mixtures thereof, the mono- or di-2-ethyl-1-hexyl hydrogen phosphates or mixtures thereof, dibutyl hydrogen phosphite, bis(tridecyl) hydrogen phosphite, the diisooctyl ester of butylphosphonic acid, the dihexyl ester of decylphosphonic acid, sulfur-containing analogs of each of the foregoing, dihexyl thiophosphite, diisopropyl dithiophosphate, tris(tridecyl)tetrathiophosphate, and like compounds. Also useful are the oil-soluble heterocyclic phosphorus compounds such as the phosphetanes and thiophosphetanes and their derivatives, such as are described for example in U.S. Pat. Nos. 3,891,726; 3,975,465; *Journal of The Chemical Society, Dalton Transactions*, 1973, pages 1576–1582; 2641–2646; 2701–2707; and Ibid, 1974, pages 633–638.

When including component 3) in the practice of Embodiment D, use can be made of any of the oil-soluble and/or oil-dispersible sulfur-containing antiwear and/or extreme pressure agents referred to hereinabove with reference to Embodiment C.

The lubricating oil compositions and additive concentrates of this invention, including the compositions of Embodiments A), B), C), and D) can, and in most cases will, contain still additional components, such as one or more of the following:

Amine Salts of Carboxylic Acids.

One or more amine salts of one or more long chain carboxylic acids can be used in such compositions. At suitably high concentrations such amine-salts improve the performance of sulfur-containing antiwear and/or extreme pressure agents when operating under highly stressful service conditions.

The acids of the amine salts can be monocarboxylic acids or polycarboxylic acids. Generally speaking, these acids contain from about 8 to about 50 carbon atoms in the molecule and thus the salts are oil-soluble. A variety of amines can be used in forming such salts, including primary, secondary and tertiary amines, and the amines can be monoamines, or polyamines. Further, the amines may be cyclic or acyclic aliphatic amines, aromatic amines, heterocyclic amines, or amines containing various mixtures of acyclic and cyclic groups.

Preferred amine salts include the alkyl and alkenyl amine salts of alkanoic acids and/or alkenoic acids, the alkyl and alkenyl amine salts of alkanedioic acids and/or alkenedioic acids and any combination of the foregoing.

The amine salts are formed by classical chemical reactions, namely, the reaction of an amine or mixture of amines, with the appropriate acid or mixture of acids. Accordingly, further discussion concerning methods for the preparation of such materials would be redundant.

Among the amine salts of long-chain acids that may be used are the following: the octyl amine salt of $C_{36}$ dimer acid (made by dimerization of linoleic acid), lauryl ammonium laurate (i.e. the lauryl amine salt of lauric acid), stearyl ammonium laurate, cyclohexyl ammonium laurate, octyl ammonium laurate, pyridine laurate, aniline laurate, lauryl ammonium stearate, stearyl ammonium stearate, cyclohexyl ammonium stearate, octylammonium stearate, pyridine stearate, aniline stearate, lauryl ammonium octanoate, stearyl ammonium octanoate, cyclohexyl ammonium octanoate, octyl ammonium octanoate, pyridine octanoate, aniline octanoate, nonyl ammonium laurate, nonyl ammonium stearate, nonyl ammonium octanoate, lauryl ammonium nonanoate, stearyl ammonium nonanoate, cyclohexyl ammonium nonanoate, octyl ammonium nonanoate, pyridine nonanoate, aniline nonanoate, nonyl ammonium nonanoate, lauryl ammonium decanoate, stearyl ammonium decanoate, cyclohexyl ammonium decanoate, octyl ammonium decanoate, pyridine decanoate, aniline decanoate, decyl ammonium laurate, decyl ammonium stearate, decyl ammonium octanoate, decyl ammonium nonanoate, decyl ammonium decanoate, bis octyl amine salt of suberic acid, bis cyclohexyl amine salt of suberic acid, bis lauryl amine salt of suberic acid, bis stearyl amine salt of suberic acid, bis octyl amine salt of sebacic acid, bis cyclohexyl amine salt of sebacic acid, bis lauryl amine salt of sebacic acid, bis stearyl amine salt of sebacic acid, the tert-dodecyl and tert-tetradecyl primary amine salts of octanoic acid, the tert-decyl and tert-dodecyl primary amine salts of octanoic acid, the tert-dodecyl and tert-tetradecyl primary amine salts of lauric acid, the tert-decyl and tert-dodecyl primary amine salts of lauric acid, the tert-dodecyl and tert-tetradecyl primary amine salts of stearic acid, the tert-decyl and tert-dodecyl primary amine salts of stearic acid, the hexyl amine salt of $C_{24}$-dicarboxylic acid, the octyl amine salt of $C_{28}$-dicarboxylic acid, the octyl amine salt of $C_{30}$-dicarboxylic acid, the decyl amine salt of $C_{30}$-dicarboxylic acid, the octyl amine salt of $C_{32}$-dicarboxylic acid, the bis lauryl dimethyl amine salt of traumatic acid, diethyl ammonium laurate, dioctyl ammonium laurate, dicyclohexyl ammonium laurate, diethyl ammonium octanoate, dioctyl ammonium octanoate, dicyclohexyl ammonium octanoate, diethyl ammonium stearate, dioctyl ammonium stearate, diethyl ammonium stearate, dibutyl ammonium stearate, dicyclopentyl ammonium stearate, dipropyl ammonium benzoate, didecyl ammonium benzoate, dimethylcyclohexyl ammonium benzoate, triethyl ammonium laurate, triethyl ammonium octanoate, triethyl ammonium stearate, triethyl ammonium benzoate, trioctyl ammonium laurate, trioctyl ammonium octanoate, trioctyl ammonium stearate, trioctyl ammonium benzoate, and the like. It will be understood of course that the amine salt of the monocarboxylic and/or polycarboxylic acid used should be sufficiently soluble in the base oil used as to provide homogeneous solution at the concentration employed.

Among the preferred amine salts for use in accordance with this invention are the primary amine salts of long chain monocarboxylic acids in which the amine thereof is a monoalkyl monoamine, $RNH_2$; the secondary amine salts of long chain monocarboxylic acids in which the amine thereof is a dialkyl monoamine, $R_2NH$; the tertiary amine salts of long chain monocarboxylic acids in which the amine thereof is a trialkyl monoamine, $R_3N$; the bis primary amine salts of long chain dicarboxylic acids in which the amine thereof is a monoalkyl monoamine, $RNH_2$; the bis secondary amine salts of long chain dicarboxylic acids in which the amine thereof is a dialkyl monoamine, $R_2NH$; the bis tertiary amine salts of long chain dicarboxylic acids in which the amine thereof is a trialkyl monoamine, $R_3N$; and mixtures thereof. In the foregoing formulae, R is an alkyl group which contains up to about 30 or more carbon atoms, and preferably from about 6 to about 24 carbon atoms.

Demulsifiers.

Typical additives which may be employed as demulsifiers include alkyl benzene sulfonates, polyethylene oxides, polypropylene oxides, block copolymers of ethylene oxide and propylene oxide, salts and esters or oil soluble acids, and the like.

Thus, for example use can be made of oxyalkylated trimethylol alkanes with molecular weights in the range of 1,000 to 10,000, and preferably in the range of 3,000 to 8,000. Preferably, the oxyalkylated trimethylol alkane is an oxyalkylated trimethylol ethane or propane, especially where the oxyalkylene groups are composed of a mixture of propyleneoxy and ethylenoxy groups and where these groups are so disposed as to form relatively hydrophobic blocks adjacent the trimethylol group and relatively hydrophilic blocks remote the trimethylol group. Typical oxyalkylated trimethylol propane demulsifiers are described in U.S. Pat. No. 3,101,374. Commercially available products of this type are available from BASF Corporation under the Pluradot trademark. They are available in various molecular weights. Pluradot HA-510 has an average molecular weight of 4,600 and Pluradot HA-530 has an average molecular weight of about 5,300. Pluradot additives are propoxylated and ethoxylated trimethylol propanes.

Another type of suitable demulsifers are oxyalkylated alkyl phenol-formaldehyde condensation products. Typically, these products have molecular weights in the range of about 4,000 to about 6,000 and are comprised of lower alkyl substituted phenol moieties joined together by methylene groups and in which the hydroxyl groups of the phenolic moieties have been ethoxylated. One such commercial product is marketed by Cema S. A. of Paris, France under the "Prochinor GR77" trade name. The product is supplied as a concentrate in an aromatic solvent and the active ingredient is believed to be an ethoxylated nonylphenol-formaldehyde condensate of molecular weight 4,200 (by gel permeation chromatography calibrated with polystyrene).

Another suitable type of demulsifier is comprised of the tetra-polyoxyalkylene derivatives of ethylene diamine, especially the tetra-poly(oxyethylene)-poly(oxypropylene) derivatives of ethylene diamine. Materials of this type are available commercially from BASF Corporation under the "Tetronics" trademark. Materials of this general type are described in U.S. Pat. No. 2,979,528.

Mixtures of alkylaryl sulfonates, polyoxyalkylene glycols and oxyalkylated alkylphenolic resins, Such as are available commercially from Petrolite Corporation under the TOLAD trademark, are also suitable. One such proprietary product, identified as TOLAD 286K, is understood to be a mixture of these components dissolved in a solvent composed of alkyl benzenes. TOLAD 286 is believed to be a similar product wherein the solvent is composed of a mixture of heavy aromatic naphtha and isopropyl alcohol.

Other preferred demulsifiers are proprietary materials available from BASF Corporation under the Pluronic trademark. These are block copolymers of propylene oxide and ethylene oxide.

Copper corrosion inhibitors.

One type of such additives is comprised of thiazoles, triazoles and thiadiazoles. Examples of such compounds include benzotriazole, tolyltriazole, octyltriazole, decyltriazole, dodecyltriazole, 2-mercaptobenzothiazole, 2,5-dimercapto-1,3,4-thiadiazole, 2-mercapto-5-hydrocarbylthio-1,3, 4-thiadiazoles, 2-mercapto-5-hydrocarbyldithio- 1,3,4-thiadiazoles, 2,5-bis(hydrocarbylthio)-1,3,4-thiadiazoles, and 2,5-bis(hydrocarbyldithio)-1,3,4-thiadiazoles. The preferred compounds are the 1,3,4-thiadiazoles, especially the 2-hydrocarbyldi-thio-5-mercapto-1,3,4-dithiadiazoles and the 2,5-bis(hydrocarbyldithio)-1,3,4-thiadiazoles, a number of which are available as articles of commerce. Such compounds are generally synthesized from hydrazine and carbon disulfide by known procedures. See for example U.S. Pat. Nos. 2,749,311; 2,760,933; 2,765,289; 2,850,453; 2,910, 439; 3,663,561; 3,862,798; 3,840,549; and 4,097,387.

Other suitable inhibitors of copper corrosion include ether amines; polyethoxylated compounds such as ethoxylated amines, ethoxylated phenols, and ethoxylated alcohols; imidazolines; and the like. Materials of these types are well known to those skilled in the art and a number of such materials are available as articles of commerce.

Supplemental ashless dispersants.

Any of a variety of additional ashless dispersants can be utilized in the compositions of this invention. These include carboxylic ashless dispersants, Mannich base dispersants, polymeric polyamine dispersants, and posttreated dispersants of these types.

The carboxylic ashless dispersants are reaction products of an acylating agent (e.g., a monocarboxylic acid, dicarboxylic acid or other polycarboxylic acid, or derivatives thereof) with one or more polyamines and/or polyhydroxy compounds. These products, are described in many patents, including British Patent Specification 1,306,529 and the following U.S. Pat. Nos.: 3,163,603; 3,184,474; 3,215,707; 3,219,666; 3,271,310; 3,272,746; 3,281,357; 3,306,908; 3,311,558; 3,316,177; 3,340,281; 3,341,542; 3,346,493; 3,381,022; 3,399,141; 3,415,750; 3,433,744; 3,444,170; 3,448,048; 3,448,049; 3,451,933; 3,454,607; 3,467,668; 3,522,179; 3,541,012; 3,542,678; 3,574,101; 3,576,743; 3,630,904; 3,632,510; 3,632,511; 3,697,428; 3,725,441; 3,868,330; 3,948,800; 4,234,435; and Re 26,433.

There are a number of sub-categories of carboxylic ashless dispersants. One such sub-category is composed of the polyamine succinamides and more preferably the polyamine succinimides in which the succinic group contains a hydrocarbyl substituent, usually an alkenyl substituent, containing at least 30 carbon atoms. These dispersants are usually formed by reacting a polyamine with an alkenyl succinic acid or anhydride such as a polyisobutenyl succinic acid and anhydride wherein the polyisobutenyl group has a number average molecular weight of 500 to 5,000, preferably 700 to 2,500, more preferably 700 to 1,400, and typically in the range of 800 to 1,300. The polyamine used in forming such compounds contains at least one primary amino group capable of forming an imide group on reaction with a hydrocarbon-substituted succinic acid or acid derivative thereof such an anhydride, lower alkyl ester, acid halide, or acid-ester. The literature is replete with descriptions of polyamines suitable for use in forming such carboxylic ashless dispersants. See for example U.S. Pat. No. 5,034,018 which describes not only simple polyamines but amidoamine adducts which are suitable for use in forming such carboxylic ashless dispersants. Representative examples of such dispersants are given in U.S. Pat. Nos. 3,172,892; 3,202,678; 3,216,936; 3,219,666; 3,254,025; 3,272,746; 4,234,435; and 5,034,018. As used herein the term succinimide is meant to encompass the completed reaction product from reaction between the amine reactant(s) and the hydrocarbon-substituted carboxylic acid or anhydride (or like acid derivative) reactant(s), and is intended to encompass compounds wherein the product may have amide, amidine, and/or salt linkages in addition to the imide linkage of the type that results from the reaction of a primary amino group and an anhydride moiety.

Another sub-category of carboxylic ashless dispersants which can be used in the compositions of this invention includes alkenyl succinic acid esters and diesters of alcohols containing 1–20 carbon atoms and 1–6 hydroxyl groups. Representative examples are described in U.S. Pat. Nos. 3,331,776; 3,381,022; and 3,522,179. The alkenyl succinic portion of these esters corresponds to the alkenyl succinic portion of the succinimides described above. Alcohols useful in preparing the esters include methanol, ethanol, 2-methylpropanol, octadecanol, eicosanol, ethylene glycol, diethylene glycol, tetraethylene glycol, diethylene glycol monoethylether, propylene glycol, tripropylene glycol, glycerol, sorbitol, 1,1,1-trimethylol ethane, 1,1,1-trimethylol propane, 1,1,1-trimethylol butane, pentaerythritol, dipentaerythritol, and the like.

The succinic esters are readily made by merely heating a mixture of alkenyl succinic acid, anhydrides or lower alkyl (e.g., $C_1$–$C_4$) ester with the alcohol while distilling out water or lower alkanol. In the case of acid-esters less alcohol is used. In fact, acid-esters made from alkenyl succinic anhydrides do not evolve water. In another method the alkenyl succinic acid or anhydrides can be merely reacted with an appropriate alkylene oxide such as ethylene oxide, propylene oxide, and the like, including mixtures thereof.

Still another sub-category of carboxylic ashless dispersants useful in forming compositions of this invention comprises an alkenyl succinic ester-amide mixture. These may be made by heating the above-described alkenyl succinic acids, anhydrides or lower alkyl esters or etc. with an alcohol and an amine either sequentially or in a mixture. The alcohols and amines described above are also useful in this embodiment. Alternatively, amino alcohols can be used alone or with the alcohol and/or amine to form the ester-amide mixtures. The amino alcohol can contain 1–20 carbon atoms, 1–6 hydroxy groups and 1–4 amine nitrogen atoms. Examples are ethanolamine, diethanolamine, N-ethanol-diethylene triamine, and trimethylol aminomethane. Representative examples of suitable ester-amide mixtures are referred to in U.S. Pat. Nos. 3,184,474; 3,576,743; 3,632,511; 3,804,763; 3,836,471; 3,862,981; 3,936,480; 3,948,800; 3,950,341; 3,957,854; 3,957,855; 3,991,098; 4,071,548; and 4,173,540.

As in the case of the other supplemental carboxylic ashless dispersants discussed above, the alkenyl succinic anhydride or like acylating agent is derived from a polyolefin, preferably a polyisobutene, having a number average molecular weight of 500 to 5,000, preferably 700 to 2,500, more preferably 700 to 1,400, and especially 800 to 1,200. Likewise, residual unsaturation in the polyalkenyl substituent group can be used as a reaction site as for example, by hydrogenation, sulfurization, or the like.

The polymeric polyamine dispersants are polymers containing basic amine groups and oil solubilizing groups (for example, pendant alkyl groups having at least about 8 carbon atoms). Such materials include, but are not limited to, interpolymers of decyl methacrylate, vinyl decyl ether or a relatively high molecular weight olefin with aminoalkyl acrylates and aminoalkyl acrylamides. Examples of polymeric polyamine dispersants are set forth in the following patents: U.S. Pat. Nos. 3,329,658; 3,449,250; 3,493,520; 3,519,565; 3,666,730; 3,687,849; and 3,702,300.

The various supplemental ashless dispersants referred to above can be subjected to post-treatment with one or more suitable reagents such as are described hereinabove. Examples of post-treatment procedures and post-treated ashless dispersants are set forth in the following U.S. Patents: U.S. Pat. Nos. 3,036,003; 3,200,107; 3,216,936; 3,256,185; 3,278,550; 3,312,619; 3,366,569; 3,367,943; 3,373,111; 3,403,102; 3,442,808; 3,455,831; 3,455,832; 3,493,520; 3,502,677; 3,513,093; 3,573,010; 3,579,450; 3,591,598; 3,600,372; 3,639,242; 3,649,229; 3,649,659; 3,702,757; 3,708,522; 4,971,598; and 4,971,711

Antioxidants.

Most oleaginous compositions will contain a conventional quantity of one or more antioxidants in order to protect the composition from premature degradation in the presence of air, especially at elevated temperatures. Typical antioxidants include hindered phenolic antioxidants, secondary aromatic amine antioxidants, sulfurized phenolic antioxidants, oil-soluble copper compounds, phosphorus-containing antioxidants, and the like.

Illustrative sterically hindered phenolic antioxidants include ortho-alkylated phenolic compounds such as 2,6-di-tert-butylphenol, 4-methyl-2,6-di-tert-butylphenol, 2,4,6-tri-tert-butylphenol, 2- tert-butylphenol, 2,6-diisopropylphenol, 2-methyl-6-tert-butylphenol, 2,4-dimethyl-6-tert-butylphenol, 4-(N,N-dimethylaminomethyl)-2,6-di-tert-butylphenol, 4-ethyl-2,6-di-tert-butylphenol, 2-methyl-6-styrylphenol, 2,6-di-styryl-4-nonylphenol, and their analogs and homologs. Mixtures of two or more such mononuclear phenolic compounds are also suitable.

Also useful are methylene-bridged alkylphenols, and these can be used singly or in combinations with each other, or in combinations with sterically-hindered unbridged phenolic compounds. Illustrative methylene bridged compounds include 4,4'-methylenebis(6-tert-butyl-o-cresol), 4,4'-methylenebis(2-tert-amyl-o-cresol), 2,2'-methylenebis(4-methyl-6-tert- butylphenol), 4,4'-methylenebis(2,6-di-tert-butylphenol), and similar compounds. Preferred are mixtures of methylene- bridged alkylphenols such as are described in U.S. Pat. No. 3,211,652.

Amine antioxidants, especially oil-soluble aromatic secondary amines can also be used. Although aromatic secondary monoamines are preferred, aromatic secondary polyamines are also suitable. Illustrative aromatic secondary monoamines include diphenylamine, alkyl diphenylamines containing 1 or 2 alkyl substituents each having up to about 16 carbon atoms, phenyl-α-naphthylamine, phenyl-β-naphthylamine, alkyl- or aralkyl-substituted phenyl-α-naphthylamine containing one or two alkyl or aralkyl groups each having up to about 16 carbon atoms, alkyl- or aralkyl-substituted phenyl-β-naphthylamine containing one or two alkyl or aralkyl groups each having up to about 16 carbon atoms, and similar compounds.

A preferred type of aromatic amine antioxidant is an alkylated diphenylamine of the general formula

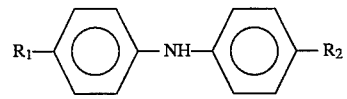

wherein $R_1$ is an alkyl group (preferably a branched alkyl group) having 8 to 12 carbon atoms, (more preferably 8 or 9 carbon atoms) and $R_2$ is a hydrogen atom or an alkyl group (preferably a branched alkyl group) having 8 to 12 carbon atoms, (more preferably 8 or 9 carbon atoms). Most preferably, $R_1$ and $R_2$ are the same. One such preferred compound is available commercially as Naugalube 438L, a material which is understood to be predominately a 4,4'-dinonyldiphenylamine (i.e., bis(4-nonylphenyl)amine) wherein the nonyl groups are branched.

Another useful type of antioxidant for inclusion in the compositions of this invention is comprised to one or more liquid, partially sulfurized phenolic compounds such as are prepared by reacting sulfur monochloride with a liquid mixture of phenols—at least about 50 weight percent of which mixture of phenols is composed of one or more reactive, hindered phenols—in proportions to provide from about 0.3 to about 0.7 gram atoms of sulfur monochloride per mole of reactive, hindered phenol so as to produce a liquid product. Typical phenol mixtures useful in making such liquid product compositions include a mixture containing by weight about 75% of 2,6-di-tert-butylphenol, about 10% of 2-tert-butylphenol, about 13% of 2,4,6-tri-tert-butylphenol, and about 2% of 2,4-di-tert-butylphenol. The reaction is exothermic and thus is preferably kept within the range of about 15° C. to about 70° C., most preferably between about 40° C. to about 60° C.

Mixtures of different antioxidants can also be used. One suitable mixture is comprised of a combination of (i) an oil-soluble mixture of at least three different sterically-hindered tertiary butylated monohydric phenols which is in the liquid state at 25° C., (ii) an oil-soluble mixture of at least three different sterically-hindered tertiary butylated methylene-bridged polyphenols, and (iii) at least one bis(4- alkylphenyl)amine wherein the alkyl group is a branched alkyl group having 8 to 12 carbon atoms, the proportions of (i), (ii) and (iii) on a weight basis falling in the range of 3.5 to 5.0 parts of component (i) and 0.9 to 1.2 parts of component (ii) per part by weight of component (iii).

Rust inhibitors.

The compositions of this invention may also contain a suitable quantity of a rust inhibitor. This may be a single compound or a mixture of compounds having the property of inhibiting corrosion of ferrous metal surfaces. Such materials include oil-soluble monocarboxylic acids such as 2-ethylhexanoic acid, lauric acid, myristic acid, palmitic acid, oleic acid, linoleic acid, linolenic acid, behenic acid, cerotic-acid, etc., and oil-soluble polycarboxylic acids including dimer and trimer acids, such as are produced from tall oil fatty acids, oleic acid, linoleic acid, or the like. Other suitable corrosion inhibitors include alkenylsuccinic acids in which the alkenyl group contains 10 or more carbon atoms such as, for example, tetrapropenylsuccinic acid, tetradecenylsuccinic acid, hexadecenylsuccinic acid, and the like; long-chain α,ω-dicarboxylic acids in the molecular weight range of 600 to 3000; and other similar materials. ProduCts of this type are currently available from various commercial sources, such as, for example, the dimer and trimer acids sold under the HYSTRENE trademark by the Humco Chemical Division of Witco Chemical Corporation and under the EMPOL trademark by Emery Chemicals. Another useful type of acidic corrosion inhibitors are the half esters of alkenyl succinic acids having 8 to 24 carbon atoms in the alkenyl group with alcohols such as the polyglycols. The corresponding half amides of such alkenyl succinic acids are also useful. Although added in acidic form, some or all of the carboxylic groups of these carboxylic acid type corrosion inhibitors may be neutralized by excess amine present in the compositions. Other suitable corrosion inhibitors include ether amines; acid phosphates; amines; polyethoxylated compounds such as ethoxylated amines, ethoxylated phenols, and ethoxylated alcohols; imidazolines; and the like. Materials of these types are well known to those skilled in the art and a number of such materials are available as articles of commerce.

Other useful corrosion inhibitors are aminosuccinic acids or derivatives thereof represented by the formula:

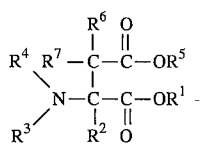

wherein each of $R^1$, $R^2$, $R^5$, $R^6$ and $R^7$ is, independently, a hydrogen atom or a hydrocarbyl group containing 1 to 30 carbon atoms, and wherein each of $R^3$ and $R^4$ is, independently, a hydrogen atom, a hydrocarbyl group containing 1 to 30 carbon atoms, or an acyl group containing from 1 to 30 carbon atoms. The groups $R^1$, $R^2$, $R^3$, $R^4$, $R^5$, $R^6$ and $R^7$, when in the form of hydrocarbyl groups, can be, for example, alkyl, cycloalkyl or aromatic containing groups. Preferably $R^1$ and $R^5$ are the same or different straight-chain or branched-chain hydrocarbon radicals containing 1–20 carbon atoms. Most preferably, $R^1$ and $R^5$ are saturated hydrocarbon radicals containing 3–6 carbon atoms. $R^2$, either $R^3$ or $R^4$, $R^6$ and $R^7$, when in the form of hydrocarbyl groups, are preferably the same or different straight-chain or branched-chain saturated hydrocarbon radicals. Preferably a dialkyl ester of an aminosuccinic acid is used in which $R^1$ and $R^5$ are the same or different alkyl groups containing 3–6 carbon atoms, $R^2$ is a hydrogen atom, and either $R^3$ or $R^4$ is an alkyl group containing 15–20 carbon atoms or an acyl group which is derived from a saturated or unsaturated carboxylic acid containing 2–10 carbon atoms.

Most preferred of the aminosuccinic acid derivatives is a dialkylester of an aminosuccinic acid of the above formula wherein $R^1$ and $R^5$ are isobutyl, $R^2$ is a hydrogen atom, $R^3$ is octadecyl and/or octadecenyl and $R^4$ is 3-carboxy-1-oxo-2-propenyl. In such ester $R^6$ and $R^7$ are most preferably hydrogen atoms.

Antifoam agents.

Suitable antifoam agents include silicones and organic polymers such as acrylate polymers. Various antifoam agents are described in *Foam Control Agents* by H. T. Kerner (Noyes Data Corporation, 1976, pages 125–176). Mixtures of silicone-type antifoam agents such as the liquid dialkyl silicone polymers with various other substances are also effective. Typical of such mixtures are silicones mixed with an acrylate polymer, silicones mixed with one or more amines, and silicones mixed with one or more amine carboxylates. Other such mixtures include combinations of a dimethyl silicone oil with (i) a partial fatty acid ester of a polyhydric alcohol (U.S. Pat. No. 3,235,498); (ii) an alkoxylated partial fatty acid ester of a polyhydric alcohol (U.S. Pat. No. 3,235,499); (iii) a polyalkoxylated aliphatic amine (U.S. Pat. No. 3,235,501); and (iv) an alkoxylated aliphatic acid (U.S. Pat. No. 3,235,502). Also useful are the metal salts of styrene-maleic anhydride copolymers (U.S. Pat. No. 3,296,131).

Friction modifiers.

These materials include such substances as the alkyl phosphonates as disclosed in U.S. Pat. No. 4,356,097, aliphatic hydrocarbyl-substituted succinimides derived from ammonia or alkyl monoamines as disclosed in European Patent Publication No. 20037, dimer acid esters as disclosed in U.S. Pat. No. 4,105,571, oleamide, and the like. Such additives, when used are generally present in amounts of 0.1 to 5 weight percent. Glycerol oleates are another example of fuel economy additives and these are usually present in very small amounts, such as 0.05 to 0.2 weight percent based on the weight of the formulated oil.

Other suitable friction modifiers include aliphatic amines or ethoxylated aliphatic amines, aliphatic fatty acid amides, aliphatic carboxylic acids, aliphatic carboxylic esters, aliphatic carboxylic ester-amides, aliphatic phosphates, aliphatic thiophosphonates, aliphatic thiophosphates, etc., wherein the aliphatic group usually contains above about eight carbon atoms so as to render the compound suitably oil soluble.

A desirable friction modifier additive combination which may be used in the practice of this invention is described in European Patent Publication No. 389,237. This combination involves use of a long chain succinimide derivative and a long chain amide.

Seal swell agents.

Additives may be introduced into the compositions of this invention in order to improve the seal performance (elastomer compatibility) of the compositions. Known materials of this type include dialkyl diesters such as dioctyl sebacate, aromatic hydrocarbons of suitable viscosity such as Panasol AN-3N, products such as Lubrizol 730, polyol esters such as Emery 2935, 2936, and 2939 esters from the Emery Group of Henkel Corp. and Hatcol 2352, 2962, 2925, 2938, 2939, 2970, 3178, and 4322 polyol esters from Hatco Corp. Generally speaking the most suitable diesters include the adipates, azelates, and sebacates of $C_8$–$C_{13}$ alkanols (or mixtures thereof), and the phthalates of $C_4$–$C_{13}$ alkanols (or mixtures thereof). Mixtures of two or more different types of diesters (e.g., dialkyl adipates and dialkyl azelates, etc.) can also be used. Examples of such materials include the n-octyl, 2-ethylhexyl, isodecyl, and tridecyl diesters of adipic acid, azelaic acid, and sebacic acid, and the n-butyl, isobutyl, pentyl, hexyl, heptyl, octyl, nonyl, decyl, undecyl, dodecyl, and tridecyl diesters of phthalic acid.

Viscosity index improvers.

Depending upon the viscosity grade required, the lubricant compositions can contain one or more viscosity index improvers (polymeric materials which are often supplied in the form of a solution in a solvent or carrier fluid). Among the numerous types of materials known for such use are hydrocarbon polymers grafted with, for example, nitrogen-containing polymers, olefin polymers such as polybutene, ethylene-propylene copolymers, hydrogenated polymers and copolymers and terpolymers of styrene with isoprene and/or butadiene, polymers of alkyl acrylates or alkyl methacrylates, copolymers of alkyl methacrylates with N-vinyl pyrrolidone or dimethylaminoalkyl methacrylate; post-grafted polymers of ethylene-propylene with an active monomer such as maleic anhydride which may be further reacted with an alcohol or an alkylene polyamine; styrene/ maleic anhydride polymers post-treated with alcohols and/or amines, and the like.

Dispersant viscosity index improvers, which combine the activity of dispersants and viscosity index improvers, suitable for use in the compositions of this invention are described, for example, in U.S. Pat. Nos. 3,702,300; 4,068, 056; 4,068,058; 4,089,794; 4,137,185; 4,146,489; 4,149, 984; 4,160,739; 4,519,929; 5,035,819; 5,035,820; 5,035, 821; and 5,035,822.

When using a viscosity index improver or a dispersant viscosity index improver it is preferred to use a material which exhibits high shear stability as measured by the FZG or Kurt-Orbahn shear stability rigs. Lubrizol 3174 additive (The Lubrizol Corporation) and HiTEC® 630 additive (Ethyl Petroleum Additives Ltd.; Ethyl Petroleum Additives Inc.; Ethyl S.A.; Ethyl Canada Limited) are illustrative of viscosity index improvers having high shear stability.

Pour point depressants.

Another useful type of additive which can be included in compositions of this invention is one or more pour point depressants. The use of pour point depressants in oil-base compositions to improve the low temperature properties of the compositions is well known to the art. See, for example, the books *Lubricant Additives* by C. V. Smalheer and R. Kennedy Smith (Lezius-Hiles Co. Publishers, Cleveland, Ohio, 1967); *Gear and Transmission Lubricants* by C. T. Boner (Reinhold Publishing Corp., New York, 1964); and *Lubricant Additives* by M. W. Ranney (Noyes Data Corporation, New Jersey, 1973). Among the types of compounds which function satisfactorily as pour point depressants in the compositions of this invention are polymethacrylates, polyacrylates, condensation products of haloparaffin waxes and aromatic compounds, and vinyl carboxylate polymers. Also useful as pour point depressants are terpolymers made by polymerizing a dialkyl fumarate, vinyl ester of a fatty acid and a vinyl alkyl ether. Techniques for preparing such polymers and their uses are disclosed in U.S. Pat. No. 3,250,715.

Other metal corrosion inhibitors.

In order to protect such metals as lead, cadmium, aluminum, magnesium, silver, zinc and alloys thereof, etc., special corrosion inhibitors can be used. These include such substances as gallic acid esters, phthalic acid esters, and the like.

The above descriptions of the various types of other additives which can be used in the compositions of this invention is not to be construed as limitive, as many other types of additives can be used in such compositions. The only requirements are that such other additives not excessively interfere adversely with the performance of the compositions of this invention and that they exhibit suitable compatibility with the additives otherwise being employed therein.

Base oils.

The ashless dispersants of this invention and the additive combinations of this invention can be incorporated in a wide variety of lubricants and functional fluids in effective amounts to provide suitable active ingredient concentrations. The base oils not only can be hydrocarbon oils of lubricating viscosity derived from petroleum (or tar sands, coal, shale, etc.), but also can be natural oils of suitable viscosities such as rapeseed oil, etc., and synthetic oils such as hydrogenated polyolefin oils; poly-α-olefins (e.g., hydrogenated or unhyrogenated α-olefin oligomers such as hydrogenated poly-1-decene); alkyl esters of dicarboxylic acids; complex esters of dicarboxylic acid, polyglycol and alcohol; alkyl esters of carbonic or phosphoric acids; polysilicones; fluorohydrocarbon oils; and mixtures of mineral, natural and/or synthetic oils in any proportion, etc. The term "base oil" for this disclosure includes all the foregoing.

The Products of This Invention and the additive combinations of this invention can thus be used in lubricating oil and functional fluid compositions, such as automotive crankcase lubricating oils, automatic transmission fluids, gear oils, hydraulic oils, cutting oils, etc., in which the base oil of lubricating viscosity is a mineral oil, a synthetic oil, a natural oil such as a vegetable oil, or a mixture thereof, e.g. a mixture of a mineral oil and a synthetic oil.

Suitable mineral oils include those of appropriate viscosity refined from crude oil of any source including Gulf Coast, Midcontinent, Pennsylvania, California, Alaska, Middle East, North Sea and the like. Standard refinery operations may be used in processing the mineral oil. Among the general types of petroleum oils useful in the compositions of this invention are solvent neutrals, bright stocks, cylinder stocks, residual oils, hydrocracked base stocks, paraffin oils including pale oils, and solvent extracted naphthenic oils. Such oils and blends of them are produced by a number of conventional techniques which are widely known by those skilled in the art.

As is noted above, the base oil can consist essentially of or comprise a portion of one or more synthetic oils. Among the suitable synthetic oils are homo- and inter-polymers of $C_2$–$C_{12}$ olefins, carboxylic acid esters of both monoalcohols and polyols, polyethers, silicones, polyglycols, silicates, alkylated aromatics, carbonates, thiocarbonates, orthoformates, phosphates and phosphites, borates and halogenated hydrocarbons. Representative of such oils are homo- and interpolymers of $C_2$–$C_{12}$ monoolefinic hydrocarbons, alkylated benzenes (e.g., dodecyl benzenes, didodecyl benzenes, tetradecyl benzenes, dinonyl benzenes, di-(2-ethylhexyl)benzenes, wax-alkylated naphthalenes); and polyphenyls (e.g., biphenyls, terphenyls). Alkylene oxide polymers and interpolymers and derivatives thereof where the terminal hydroxyl groups have been modified by esterification, etherification, etc., constitute another class of synthetic oils. These are exemplified by the oils prepared through polymerization of alkylene oxides such as ethylene oxide or propylene oxide, and the alkyl and aryl ethers of these polyoxyalkylene polymers (e.g., methyl polyisopropylene glycol ether having an average molecular weight of 1,000, diphenyl ether of polyethylene glycol having a molecular weight of 500–1,000, diethyl ether of polypropylene glycol having a molecular weight of 1,000–1,500) or mono- and poly-carboxylic esters thereof, for example, the acetic acid ester, mixed $C_3$–$C_6$ fatty acid esters, or the $C_{13}$ Oxo acid diester of tetraethylene glycol.

Another suitable class of synthetic oils comprises the esters of dicarboxylic acids (e.g., phthalic acid, succinic acid, maleic acid, azelaic acid, suberic acid, sebacic acid, fumaric acid, adipic acid, linoleic acid dimer) with a variety of alcohols (e.g., butyl alcohol, hexyl alcohol, dodecyl alcohol, 2-ethylhexyl alcohol, ethylene glycol). Specific examples of these esters include dibutyl adipate, di(2-ethylhexyl) adipate, didodecyl adipate, di(tridecyl) adipate, di(2-ethylhexyl) sebacate, dilauryl sebacate, di-n-hexyl fumarate, dioctyl sebacate, diisooctyl azelate, diisodecyl azelate, dioctyl phthalate, didecyl phthalate, di(eicosyl) sebacate, the 2-ethylhexyl diester of linoleic acid dimer, and the complex ester formed by reacting one mole of sebacic acid with two moles of tetraethylene glycol and two moles of 2-ethylhexanoic acid.

Other esters which may be used include those made from $C_3$–$C_{18}$ monocarboxylic acids and polyols and polyol ethers such as neopentyl glycol, trimethylolpropane, pentaerythritol and dipentaerythritol. Trimethylol propane tripelargonate, pentaerythritol tetracaproate, the ester formed from trimethylolpropane, caprylic acid and sebacic acid, and the polyesters derived from a $C_4$–$C_{14}$ dicarboxylic acid and one or more aliphatic dihydric $C_3$–$C_{12}$ alcohols such as derived from azelaic acid or sebacic acid and 2,2,4-trimethyl-1,6-hexanediol serve as examples.

Silicon-based oils such as the polyalkyl-, polyaryl-, polyalkoxy-, or polyaryloxy-siloxane oils and silicate oils comprise another class of synthetic lubricants (e.g., tetraethyl silicate, tetraisopropyl silicate, tetra-(2-ethylhexyl) silicate, tetra-(p-tert-butylphenyl) silicate, poly(methyl)siloxanes, and poly(methylphenyl)siloxanes. Other synthetic lubricating oils include liquid esters of phosphorus-containing acids (e.g., tricresyl phosphate, trioctyl phosphate, triphenyl phosphite, and diethyl ester of decane phosphonic acid.

Also useful as base oils or as components of base oils are hydrogenated or unhydrogenated liquid oligomers of $C_6$–$C_{16}$ α-olefins, such as hydrogenated or unhydrogenated oligomers formed from 1-decene. Methods for the production of such liquid oligomeric 1-alkene hydrocarbons are known and reported in the literature. See for example U.S. Pat. Nos. 3,749,560; 3,763,244; 3,780,128; 4,172,855; 4,218,330; 4,902,846; 4,906,798; 4,910,355; 4,911,758; 4,935,570; 4,950,822; 4,956,513; and 4,981,578. Additionally, hydrogenated 1-alkene oligomers of this type are available as articles of commerce, e.g., under the trade designations ETHYLFLO 162, ETHYLFLO 164, ETHYLFLO 166, ETHYLFLO 168, ETHYLFLO 170, ETHYLFLO 174, and ETHYLFLO 180 poly-α-olefin oils (Ethyl Corporation; Ethyl Canada Limited; Ethyl S.A.). ETHYLFLO is a trademark of Ethyl Corporation. Blends of such materials can also be used in order to adjust the viscometrics of the given base oil. Suitable 1-alkene oligomers are also available from other suppliers. As is well known, hydrogenated oligomers of this type contain little, if any, residual ethylenic unsaturation.

Preferred oligomers are formed by use of a Friedel-Crafts catalyst (especially boron trifluoride promoted with water or a $C_{1-20}$ alkanol) followed by catalytic hydrogenation of the oligomer so formed using procedures such as are described in the foregoing U.S. patents.

Other catalyst systems which can be used to form oligomers of 1-alkene hydrocarbons, which, on hydrogenation, provide suitable oleaginous liquids include Ziegler catalysts such as ethyl aluminum sesquichloride with titanium tetrachloride, aluminum alkyl catalysts, chromium oxide catalysts on silica or alumina supports and a system in which a boron trifluoride catalyst oligomerization is followed by treatment with an organic peroxide.

It is also possible in accordance with this invention to utilize blends of one or more liquid hydrogenated 1-alkene oligomers in combination with other oleaginous materials having suitable viscosities, provided that the resultant blend has suitable compatibility and possesses the physical properties desired.

For some applications, for example use under conditions where oxidative or thermal degradation of the base oil is unlikely to be experienced, unhydrogenated 1-alkene oligomers can be used as the base oil or as a component in a base oil blend.

Likewise, various proprietary synthetic lubricants such as KETJENLUBE synthetic oil of Akzo Chemicals can be employed either as the sole base lubricant or as a component of the base lubricating oil.

Typical natural oils that may be used as base oils or as components of the base oils include castor oil, olive oil, peanut oil, rapeseed oil, corn oil, sesame oil, cottonseed oil, soybean oil, sunflower oil, safflower oil, hemp oil, linseed oil, tung oil, oiticica oil, jojoba oil, meadowfoam oil, and the like. Such oils may be partially or fully hydrogenated, if desired.

The fact that the base oils used in the compositions of this invention may be composed of (i) one or more mineral oils, (ii) one or more synthetic oils, (iii) one or more natural oils, or (iv) a blend of (i) and (ii), or (i) and (iii), or (ii) and (iii), or (i), (ii) and (iii) does not mean that these various types of oils are necessarily equivalents of each other. Certain types of base oils may be used in certain compositions for the specific properties they possess such as biodegradability, high temperature stability, non-flammability or lack of corrosivity towards specific metals (e.g. silver or cadmium). In other compositions, other types of base oils may be preferred for reasons of availability or low cost. Thus, the skilled artisan will recognize that while the various types of base oils discussed above may be used in the compositions of this invention, they are not necessarily functional equivalents of each other in every instance.

Proportions and Concentrations

In general, the components of the additive compositions of this invention are employed in the oleaginous liquids (e.g., lubricating oils and functional fluids) in minor amounts sufficient to improve the performance characteristics and properties of the base oil or fluid. The amounts of the components used in the base oil will vary in accordance with such factors as the viscosity characteristics of the base oil or fluid employed, the viscosity characteristics desired in the finished product, the service conditions for which the finished product is intended, and the performance characteristics desired in the finished product. However, generally speaking, the amounts of the components utilized in Embodiments A, B, C and D will fall in the ranges set forth hereinabove. The following concentrations (weight percent) of other components (on an active ingredients basis, i.e., excluding diluents which often are associated therewith) in the base oils or fluids are illustrative:

|  | Typical Range | Preferred Range |
| --- | --- | --- |
| Amine salt of carboxylic acid | 0–1 | 0.01–2 |
| Demulsifier | 0–0.5 | 0–0.2 |
| Cu corrosion inhibitor | 0–0.5 | 0.01–0.2 |
| Supplemental ashless dispersant | 0–3 | 0–2 |
| Antioxidant | 0–2 | 0–1 |
| Rust inhibitor | 0–1 | 0.02–0.5 |
| Antifoam agent | 0–0.3 | 0.0002–0.1 |
| Friction modifier | 0–2 | 0–1 |
| Seal swell agent | 0–20 | 0–10 |
| Viscosity index improver | 0–20 | 0–15 |
| Pour point depressant | 0–2 | 0–1 |
| Other metal corrosion inhibitors | 0–1 | 0–0.5 |

It is to be noted that some additives are multifunctional additives capable of contributing more than a single property to the blend in which they are used. Thus when employing a multifunctional additive component in the compositions of this invention, the amount used should of course be sufficient to achieve the function(s) and result(s) desired therefrom.

It will be appreciated that the individual components can be separately blended into the base oil or fluid or can be blended therein in various subcombinations, if desired. Moreover, such components can be blended in the form of separate solutions in a diluent. Except for viscosity index improvers and/or pour point depressants (which in many instances are blended apart from other components), it is preferable to blend the other selected components into the base oil by use of an additive concentrate of this invention, as this simplifies the blending operations, reduces the likelihood of blending errors, and takes advantage of the compatibility and solubility characteristics afforded by the overall concentrate.

The additive concentrates of this invention will contain the individual components in amounts proportioned to yield finished oil or fluid blends consistent with the concentrations tabulated above. In most cases, the additive concentrate will contain one or more diluents such as light mineral oils, to facilitate handling and blending of the concentrate. Thus concentrates containing up to 80% by weight of one or more diluents or solvents can be used.

The oleaginous liquids provided by this invention can be used in a variety of applications. For example, they can be employed as crankcase lubricants, gear oils, hydraulic fluids, manual transmission fluids, automatic transmission fluids, cutting and machining fluids, brake fluids, shock absorber fluids, heat transfer fluids, quenching oils, transformer oils, and the like. The compositions are particularly suitable for use as automotive and industrial gear oils.

Blending

To make the compositions of this invention, one either purchases or synthesizes each of the respective individual components to be used in the formulation or blending operation. Unless one is already in the commercial manufacture of one or more such components, it is usually simpler and thus preferable to purchase, to the extent possible, the ingredients to be used in the compositions of this invention. If it is desired to synthesize one or more components, use may be made of synthesis procedures referred to in the literature, including, but by no means limited to, the applicable references cited herein. In some cases, the components can be formed in situ by in situ reactions between or among components introduced into the mixture. For example, amine salts of monothiophosphoric acid esters can be formed in situ by introducing into the blending vessel a material such as sulfurized isobutylene and one or more amines, followed by the introduction of one or more dihydrocarbyl hydrogen phosphites.

The formulation or blending operations are relatively simple and involve mixing together in a suitable container or vessel, using a dry, inert atmosphere where necessary or desirable, appropriate proportions of the selected ingredients. Those skilled in the art are cognizant of and familiar with the procedures suitable for formulating and blending additive concentrates and lubricant compositions. Usually the order of addition of components to the blending tank or vessel is not critical provided of course, that the components being blended at any given time are not incompatible or excessively reactive with each other. Agitation such as with mechanical stirring equipment is desirable to facilitate the blending operation. Frequently it is helpful to apply sufficient heat to the blending vessel during or after the introduction of the ingredients thereto, so as to maintain the temperature at, say, 40°–60° C., and preferably no higher than about 60° C. Similarly, it is sometimes helpful to preheat highly viscous components to a suitable temperature even before they are introduced into the blending vessel in order to render them more fluid and thereby facilitate their introduction into the blending vessel and render the resultant mixture easier to stir or blend. Naturally the temperatures used during the blending operations should be controlled so as not to cause any significant amount of thermal degradation or unwanted chemical interactions.

When forming the lubricant compositions of this invention, it is usually desirable to introduce the additive ingredients into the base oil with stirring and application of mildly elevated temperatures, as this facilitates the dissolution of the components in the oil and achievement of product uniformity.

At numerous places throughout this specification, reference has been made to a considerable number of U.S. patents, published foreign patent applications, journal articles, passages in books, or encyclopedia, and the like. All such cited documents are expressly incorporated in full into this disclosure as if fully set forth herein.

This invention is susceptible to considerable variation in its practice within the spirit and scope of the ensuing claims, the forms hereinbefore described constituting preferred embodiments thereof.

What is claimed is:

1. An oil-soluble lubricating oil dispersant formed by reacting (a) at least one oil-soluble lubricating oil dispersant selected from (i) substituted succinimide dispersant in which the substituent is derived from a $C_2$ to $C_5$ monoolefin polymer having a number average molecular weight within the range of 700 to 3000, said succinimide dispersant having at least one acylatable primary or secondary amino group, (ii) substituted succinic esteramide dispersant in which the substituent is derived from a $C_2$ to $C_5$ monoolefin polymer having a number average molecular weight within the range of 700 to 3000, said succinic esteramide dispersant having at least one acylatable primary or secondary amino group, and/or at least one acylatable hydroxyl group, and (iii) Mannich condensation product formed by condensing long chain hydrocarbyl substituted hydroxyaromatic compound with aldehyde and polyamine, said, Mannich condensation product containing at least one acylatable primary or secondary amino group, wherein said long chain hydrocarbyl substituent has 50 to 300 carbon atoms and is dived from a polymer of a $C_2$ to $C_5$ mono-α-olefin, with
(b) at least one modified polymer of isobutene of the formula
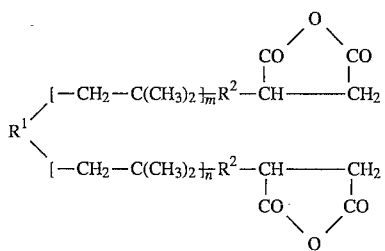
where $R^1$ is an olefinically unsaturated divalent radical, $R^2$ is one of the divalent radicals.
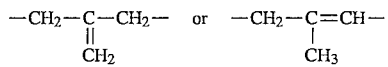
and m an n are each at least 1.